United States Patent [19]

Christensen

[11] Patent Number: 5,483,528

[45] Date of Patent: Jan. 9, 1996

[54] TDM DIGITAL MATRIX INTERCOM SYSTEM

[75] Inventor: Steven G. Christensen, Minneapolis, Minn.

[73] Assignee: Telex Communications, Inc., Minneapolis, Minn.

[21] Appl. No.: 321,428

[22] Filed: Oct. 11, 1994

[51] Int. Cl.$^6$ ............................... H04J 3/02; H04M 9/02; H04M 9/08

[52] U.S. Cl. .................... 370/62; 370/85.1; 379/167; 381/119

[58] Field of Search .......................... 370/85.1, 58.1, 370/65.5, 67, 62; 379/167, 202; 381/119, 109, 104

[56] References Cited

U.S. PATENT DOCUMENTS

| 4,188,511 | 2/1980 | Smith et al. | 379/157 |
|---|---|---|---|
| 4,716,585 | 12/1987 | Tompkin et al. | 370/62 |
| 5,027,347 | 6/1991 | Malkki | 370/62 |
| 5,309,517 | 5/1994 | Barclay | 381/119 |

OTHER PUBLICATIONS

Duncan, Samuel H., et al, "Designing 2.1V Futurebus+ Termination System Requires System–Engineering Approach," *EDN*, May 26, 1994, pp. 117–122.

Product brochure entitled "Application Note 3000/002 Drake Products Division, Intercom Products," 12 pages.

Product brochure entitled "DCS3000, Digital Voice Communications System," McCurdy Radio Industries Limited, Toronto, Canada, 8 pages.

Product brochure entitled "Matrix Plus II System Features and Benefits," 18 pages, Clear–Com, 945 Camelia Street, Berkeley, Calif. 94710.

Product Guide entitled "Digidesign–Creative Audio Production Tools," Digidesign, 1360 Willow Road, Menlo Park, Calif. 94025, 4 pages.

Primary Examiner—Douglas W. Olms
Assistant Examiner—Min Jung
Attorney, Agent, or Firm—Gregory P. Kaihoi

[57] ABSTRACT

A time division multiplexing ("TDM") digital matrix intercom system for connecting intercom stations. The system includes a digital switching system receiving audio input communications signals from at least some of the intercom stations, and sending audio input communications signals to at least some of the intercom stations. The digital switching system includes a TDM system for broadcasting on a TDM bus multiple digital communications signals including such digital audio input signals. The TDM system includes one or more interfaces connecting intercom stations with the TDM bus. The system also includes a signal mixer which is capable of receiving from the TDM bus selected ones of the digital audio input signals, and creating and broadcasting on the TDM bus a custom mixed digital audio output communications signal which is a loudness weighted mix of such selected digital audio input signals with at least one of such selected signals optionally being given a larger weight corresponding to a louder volume than others of the selected signals. A custom mixed digital audio output signal thus may be routed to a selected one of the intercom stations as an audio output communications signal. Preferably the system includes an integrated circuit for producing custom output mix signals.

14 Claims, 21 Drawing Sheets

IN 0    OUT =    IN 1
        IN 0 + IN 1

Fig. 22A

| Fig. 22B | Fig. 22C |
|---|---|
| Fig. 22D | Fig. 22E |

Fig. 23A
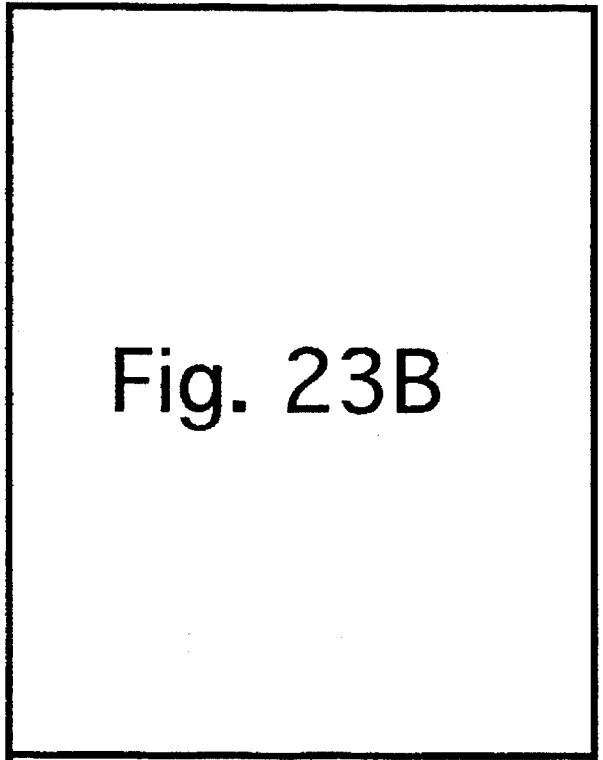
Fig. 23B
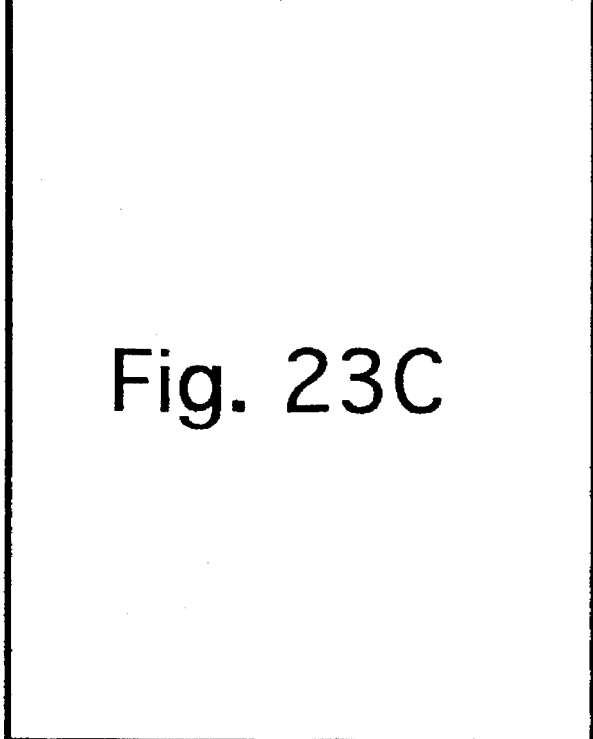
Fig. 23C

TDM DIGITAL MATRIX INTERCOM SYSTEM

FIELD OF THE INVENTION

The invention relates to intercom systems which permit a number of individuals to communicate with one another from remote locations. In particular, the invention relates to the use of a time division multiplexing ("TDM") digital switching matrix system in an intercom system.

BACKGROUND OF THE INVENTION

Intercom systems are used in a variety of commercial contexts to provide communication between two or more individuals located remote from one another. Although even simple intercom systems are capable of providing private point-to-point communication between just two individuals, state-of-the-art systems are designed to provide "conference-type" communication, connecting several intercom stations with one another simultaneously, so that several individuals can talk jointly with one another. Examples of commercial contexts utilizing such systems include television production facilities, stadiums, theaters, and the like.

Conventionally, intercom systems used by such establishments employ a matrix of switches, called a crosspoint switch. A crosspoint switch is utilized when a system has many sources and many destinations, any of which may need to communicate with a changing mix of any of the others at various times during system operation. Even if one particular facility can "hard-wire" its sources and destinations in a static configuration, any system intended for use by facilities with differing needs can benefit from the ease of configurability that a crosspoint switch provides. In short, a crosspoint switch is employed any time the desired connectivity between a system's multiple sources and destinations cannot be known in advance of the system's hardware design.

To make use of a crosspoint switch, the system architecture is set up as follows: instead of connecting the various source equipment and destination equipment directly in point-to-point fashion, each source and destination is connected only to the crosspoint; which makes cross connections between the sources and destinations internally. A signal thus makes two hops in going from source to destination; it must always travel via the crosspoint.

A crosspoint switch can be implemented as a matrix of SPST switches between input and output lines, as shown in FIG. 1. Typically the switches are tiny semiconductor switches which are digitally controlled via software. The signal path through the switches may either be analog or serial digital. In FIG. 1 a 4×4 crosspoint switch matrix is shown. Any of the source signals, A through D, can be connected to any of the destination paths, E through H. If, for example, it were desired to route source signal C through to destination F and at the same time route source signal B through to destination H, one would close switches 9 and 7, as shown in FIG. 1.

Input signals can also be sent out to multiple destinations in parallel, as shown in FIG. 2 (i.e., a "Y" connection). But one may not route more than one signal onto a single destination path, as shown in FIG. 3. This attempt causes a direct short between the outputs of two driver amplifiers elsewhere in the system, and could actually result in electrical damage either to the switches or to the external signal source equipment. (The correct way to combine two or more signals would be to route the source signals to separate outputs, and then sum them—external to the crosspoint—with a mixer unit).

The disadvantage of the matrix-of-switches approach to implementing a crosspoint is that the cost of the matrix grows in geometric proportion to the number of inputs and outputs to be connected. That is, though a 4×4 matrix only requires 16 switches, a 100×100 matrix requires 10,000 switches, and a 500×500 matrix would require 250,000 switches. Thus, beyond a certain system size, a hierarchical matrix of matrices must be constructed in order to achieve complete cross-connectivity. In addition, implementing analog "Y" connections to multiple destinations in parallel will result in signal degradation due to impedance mismatches if too many destinations are driven. To prevent this, input and output drivers must be included, further adding to the crosspoint's cost while degrading its signal-to-noise ratio. Thus, in practice, the matrix-of-switches crosspoint is practical only for small to medium size systems.

SUMMARY OF THE INVENTION

The invention provides an intercom system that utilizes time division multiplexing ("TDM") technology to provide interconnection of intercom stations, including the ability to provide custom mixed intercom signals to specific intercom stations within the system. That is, an individual station may be provided with a composite communications signal which includes signals from several other specific sources within the system, and the volume level of each of these sources may be individually controlled to provide a signal that is custom mixed for the listener. Other listeners may be provided with different custom mixes (even of the same source signals), each being particularly suited to the needs and desires of the listener. The utilization of TDM technology in mixing signals and setting custom volume levels for system listeners, in accordance with the system of the invention, permits relatively large intercom systems to be constructed (and expanded) without a geometric growth in the size of the crosspoint switch. It allows distribution of the system's switching capability among various modules of the system, and also permits dynamic sharing of the mixing capability among the various modules so that, for example, if one module is being requested to perform mixing functions beyond its size, it can, in effect, borrow mixing capability from other modules in the system.

An intercom system of the invention typically includes a plurality of intercom stations, at least some of which include an audio input (typically equipped with a microphone) generating an audio input communications signal, and at least some of which include an audio output (typically equipped with a speaker or headset) generated from an audio output communications signal. Each of the stations is connected to a TDM-based digital switching system, which receives audio input communications signals from at least some of the stations and sends audio output communications signals to at least some of the stations. Analog-to-digital converters are provided for creating digital audio input signals derived from the audio input communications signals received by the intercom stations. The digital switching system utilizes a time division multiplexing ("TDM") system for broadcasting on a TDM bus multiple digital communications signals including the digital audio input signals. The TDM includes interfaces for connecting the individual intercom stations with the TDM bus, permitting them to send signals to the bus and receive signals from the bus.

A signal mixer is provided for creating the individual custom signals to be sent to the intercom listening stations. For each custom signal to be mixed, the mixer obtains the desired component input signals from the TDM bus, and adjusts the loudness of each such component signal according to the signal mix requested. If the custom signal mix is requested only by a "client" (i.e., an intercom keypanel) served by the board on which the mixer is located, the custom mixed digital audio output communications signal may be sent directly to that client. If, however, the signal mix is requested by any other client, the custom mixed output signal is broadcast on the TDM bus for receipt by the requesting client. This signal, thus, is a loudness weighted mix of the selected digital audio input signals with typically at least one of the selected input signals being given a larger weight corresponding to a louder volume than others of the selected signals; moreover, the mixer also provides custom mixed signals for other listeners in the system, with at least some of the custom mixed output signals being comprised of a weighted loudness mix of digital audio input signals that is different than the weighted mix of other custom mixed digital audio output signals (i.e., the volume of a given signal may be louder for one listener than for another listener). Custom volume mixed digital audio output signals broadcast on the TDM bus may then be received at any one (or more) of the intercom stations as an audio output communications signal and convened by the audio output transducer to audio output.

The system may be utilized with analog intercom stations, the central unit containing an analog-to-digital converter; alternately, the individual intercom stations may be provided with A/D and D/A converters.

The system includes a microprocessor based control system capable of receiving and acting on requests from the individual intercom stations—i.e., a listener at an intercom station can request which signals he or she wants to listen to, and the control system monitors and carries out those requests, directing the mixer to select the appropriate signals and to properly set the relative volume levels of each selected signal. The volume level for a particular signal may be selected by the listener at a keypanel, or, if desired, may be pre-programmed into the control system.

In a preferred embodiment, the system mixer comprises a plurality of essentially identical CMOS application specific integrated circuits (ASIC), each having the capability of producing a plurality of sub-mixes from a plurality "m" of input signals; the number of digital input signals in each sub-mix created by a particular ASIC is dynamically controllable within the range of 0 to m-x where "x" is the number of signal inputs simultaneously allocated to the other sub-mixes. Thus, if a particular ASIC is requested to perform mixing beyond its capacity, portions of the requested mixes can be mixed by other ASIC's on the TDM system, permitting great flexibility in utilization of the mixing capacity of the total system.

BRIEF DESCRIPTION OF THE DRAWINGS

FIG. 23 depicts the operation of the mixer in the ASIC.

DETAILED DESCRIPTION OF THE INVENTION

Figure 1:
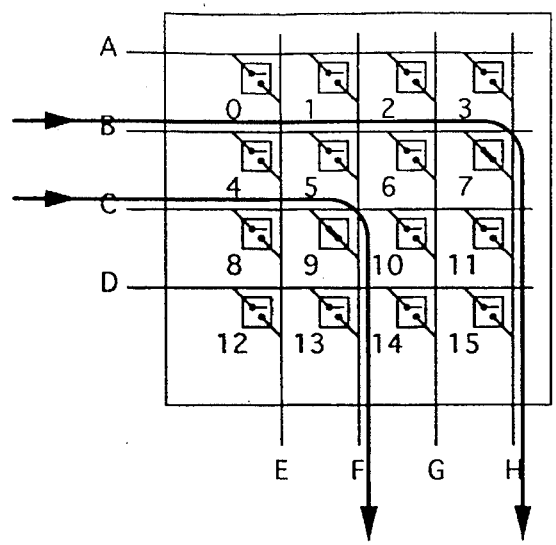
FIG. 1 is a schematic drawing of a prior art crosspoint switch matrix connecting two input lines to two output lines.
Figure 2:
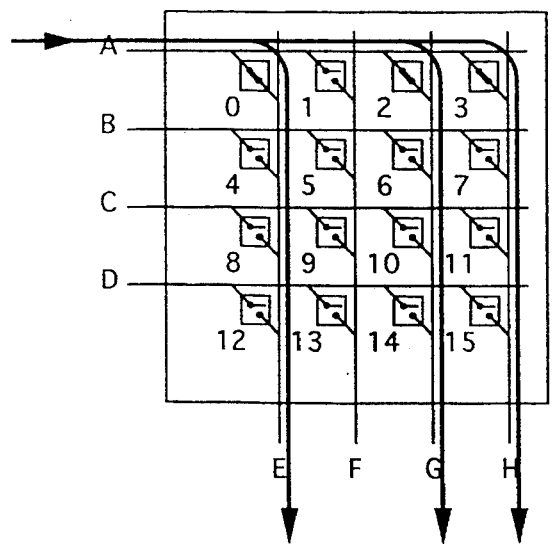
FIG. 2 is a schematic drawing of a prior art crosspoint switch matrix connecting one input line to three output line.
Figure 3:
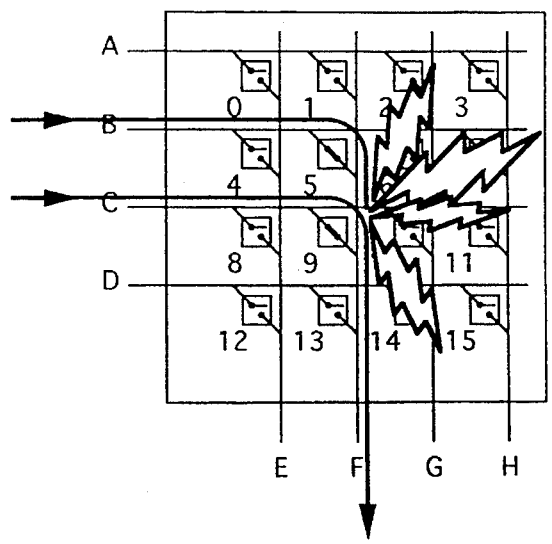
FIG. 3 is a schematic drawing of a prior art crosspoint switch matrix attempting to connect three input lines to one output line (and causing an electrical short)

Time division multiplexing ("TDM") is a well-known technique for allowing a single physical conductive path to carry many channels of information, such as in telecommunications. The many channels of information carried on a TDM link can all "fit" because they all take turns using it in round-robin fashion. When the last channel has taken its ram, the first channel takes another, and so on, in a regularly repeating way.

Many commonly employed digital signals, such as digital audio, are already in a form compatible with TDM transmission. Such signals consist of a sequence of measurements, or "samples", evenly spaced in time. A TDM scheme simply interleaves the samples of several digital signals. This can be done if all the signals to be utilized have the same amount of time between samples, i.e., they all have the same sample rate.

On a TDM link, time is divided into two hierarchical units: the Frame and the Time Slot, each Frame being composed of multiple Time Slots. A Time Slot is the amount of time allotted each channel in its turn, and the Frame is the amount of time it takes for all the channels to have one turn (plus any "overhead" for synchronization or other purposes).

The Frame Rate is the inverse of the Frame time; it is the rate at which the Frames repeat. Since each channel gets one turn per Frame, the Frame Rate also represents the frequency of "turns" from the perspective of each individual channel, i.e., it must be equal to the basic sample rate of all the channels. The Word Rate is the inverse of the Time Slot's duration; it represents the frequency at which data must change on the TDM link to accommodate the number of channels desired (assuming the data is transmitted in parallel fashion). If the data on the TDM link is to be transmitted serially, then each Time Slot will be further subdivided into Bit Times. The inverse of the Bit Time is the Bit Rate.

For example, in teleccommunications a given trunk may carry, e.g., 24 phone calls across long distances. Before being sent across the trunk, each phone call's signal is digitized into 8-bit words at the rate of 8 kHz. Thus, each signal's turn on the fine must recur at the rate of 8 kHz; this becomes the Frame Rate of the trunk. Since there are 24 channels to send in each Frame, the total number of data bits per Frame is 192. A 193rd overhead bit is added for frame synchronization. The Bit Rate is thus 8 kHz Frames×193 Bits/Frame=1.544 MHz Bits. The Bit Time is then 648 nsec, and a Time Slot's duration is 648 nsec/Bit×8 Bits/Word= 5.18 μsec.

The previous example describes a point-to-point TDM link, where the technique is used to transmit many channels over long distance using just a single conducting path (i.e., a single trunk). A TDM may also be used to simplify the hardware required to implement a crosspoint switch for digitized signals. A TDM architecture can significantly reduce the cost of larger crosspoint matrices, for reasons described below. In addition, the TDM matrix is "transparent" to the signals being switched through it, in terms of noise and distortion, no matter how many parallel destinations are driven: In a digital system, noise and distortion parameters are affected only by the analog-to-digital and digital-to-analog conversion equipment and not at all by processes occurring strictly in the digital domain, such as a TDM crosspoint.

Figure 4:
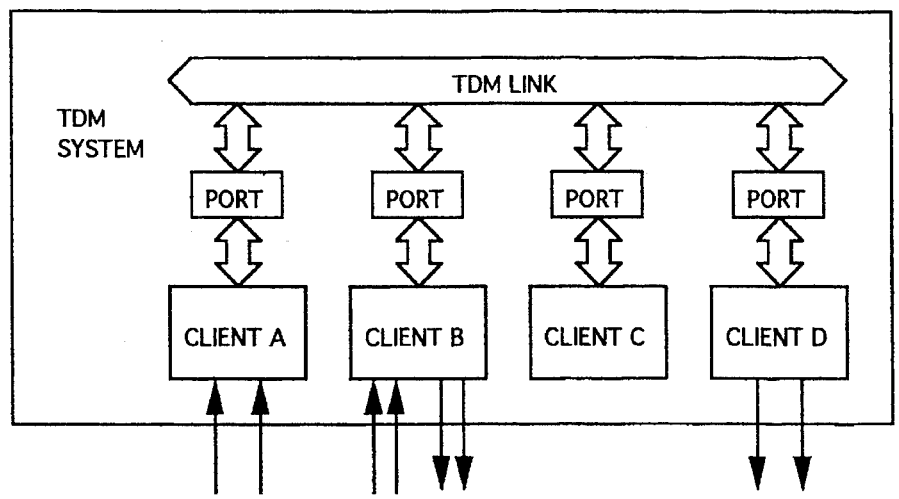
FIG. 4 is a block diagram of a TDM switching system.

Rather than simply connecting a TDM in point-to-point fashion as described in the example above, a TDM matrix may be implemented by allowing multiple ports to be connected to the TDM, as shown in FIG. 4. Each port is the interface through which a "Client" gains access to the signals being conducted by the TDM link, and to the destination signal paths provided by the TDM.

Figure 5:
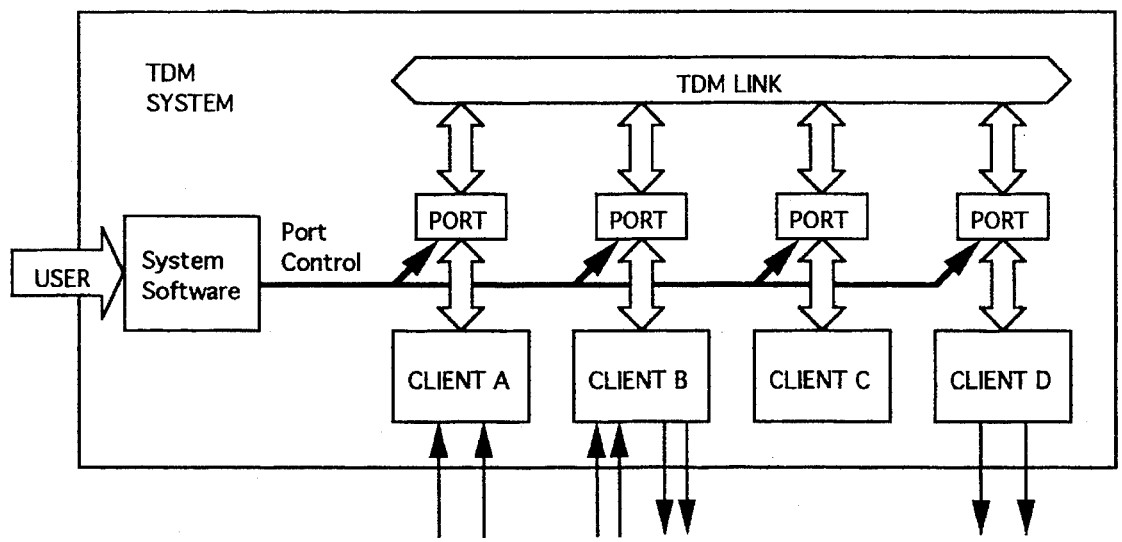
FIG. 5 is a block diagram similar to FIG. 4 illustrating system software control of the TDM switching system.

These TDM ports are the physical interface between Client and TDM, like the individual switches between source and destination in the above analog crosspoint description. But like those switches, which may be open or closed, the port's actual electrical connections to the TDM are controlled by the System Software, (see FIG. 5) which itself operates in service of the user. Nevertheless, a Client's TDM port represents a potential connection with each and every possible remote source or destination located elsewhere in the system.

From the point of view of each Client, any TDM Time Slots which remain un-driven by other Clients represent available destination paths for its outbound signals. Through its TDM interface, each Client has the capability to drive one or more of the available TDM Time Slots, or to pull in the signals present in one or more of the Time Slots and use these inbound signals in some fashion. Or it may do both. Digital signal processors ("DSP'S") such as an equalizer or dynamic range compressor, for example, would take an input signal from one Time Slot, process it, and then drive it out onto another Time Slot.

TDM Clients may thus be broadly categorized as being TDM sources, destinations, or throughput processors.

A TDM Source Client will either have a signal coming into it from the outside world which it will then make available to the rest of the system by driving it out onto the TDM (perhaps also pre-processing it in some fashion along the way), or it may simply drive the TDM with signals it has generated internally "from scratch", directly in the digital domain.

A TDM Destination Client will almost always take the signals it gets from the TDM and relay them to the outside world (unless it is merely a display device), although it too may process them along the way.

A TDM Throughput Processor always generates its TDM signals using other TDM signals as its raw materials.

A TDM Client may also be categorized according to the number of channels it accommodates. As used in this context, the word "channel" means a signal path on the Client side of a TDM Interface (a signal path on the TDM side will be referred to only as a Time Slot). Every TDM Client has access to the same number of Time Slots (all of them), but they may process or relay differing numbers of Channels. Time Slots are absolute, Channels are relative. That is, there are only so many TDM Time Slots in the whole system, they exist in only one place in the system, and they are all uniquely identifiable, one from all the others. They all have a unique number used to refer to them—their Time Slot Number. The numbering starts from zero for the first Time Slot in a Frame, and continues up to some MaxCount for the last Time Slot in the Frame. They have no direction associated with them, they are all "broadcast" on the TDM Bus.

Figure 6:
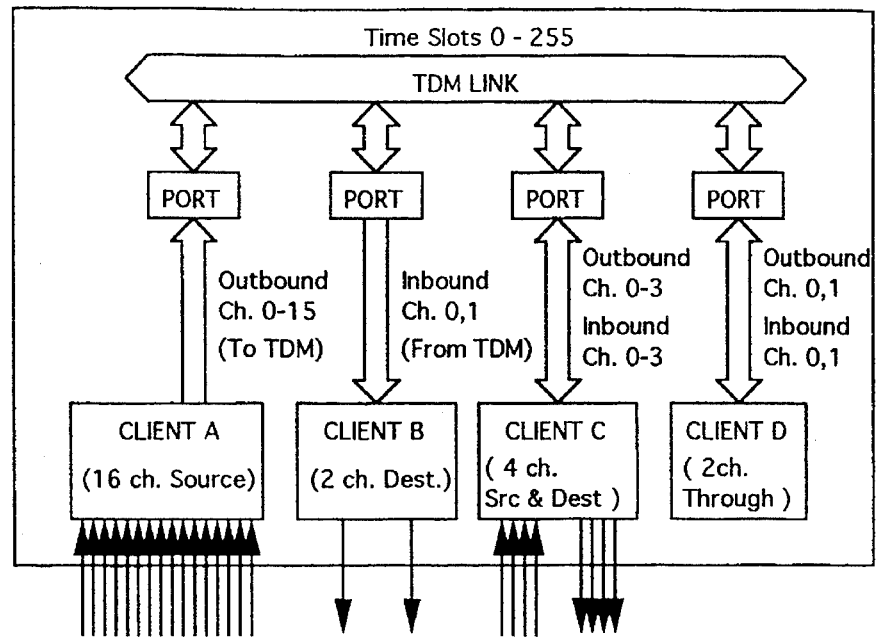
FIG. 6 is a block diagram similar to FIG. 4 illustrating the numbering of inbound and outbound channels.

Channels, on the other hand, are relative in the sense that every Client has some of them, and each Client numbers them from zero up to some MaxChan (see FIG. 6). They also have a direction from the Client's perspective relative to the TDM; they are either Outbound or Inbound. So there are as many Inbound Channel Zeroes in the system as there are Clients, whereas there is only one Time Slot 0. All the Inbound Channel Zeroes might carry a unique signal, but they are all named Inbound Channel 0 on their respective Clients.

Furthermore, Client A's Outbound Channel 13 might go across the TDM and become Client C's Inbound Channel 3. It is the same signal, but it is named differently over at Client C than it is on Client A. So Client Channels are local and their numbers are relative only to the other channels accommodated by their Client, whereas TDM Time Slots are global and absolute.

Clients are not in communication directly with each other; i.e., Clients communicate with the rest of the world only through their TDM Interface, and all their TDM Interfaces are under the direct control of the System Software. The Client does not set up its own TDM Interface, so it doesn't know where its outbound signals ultimately go, nor does it know from whence its inbound signals originated.

This type of data—the data of system interconnectivity—is maintained on the next higher level of hierarchy: the system software. The system software orchestrates the overall functionality of the system; the Clients are the building blocks used by the system software to construct the overall functionality. Each Client serves as a modular element in a system comprised of many such elements.

Figure 7:
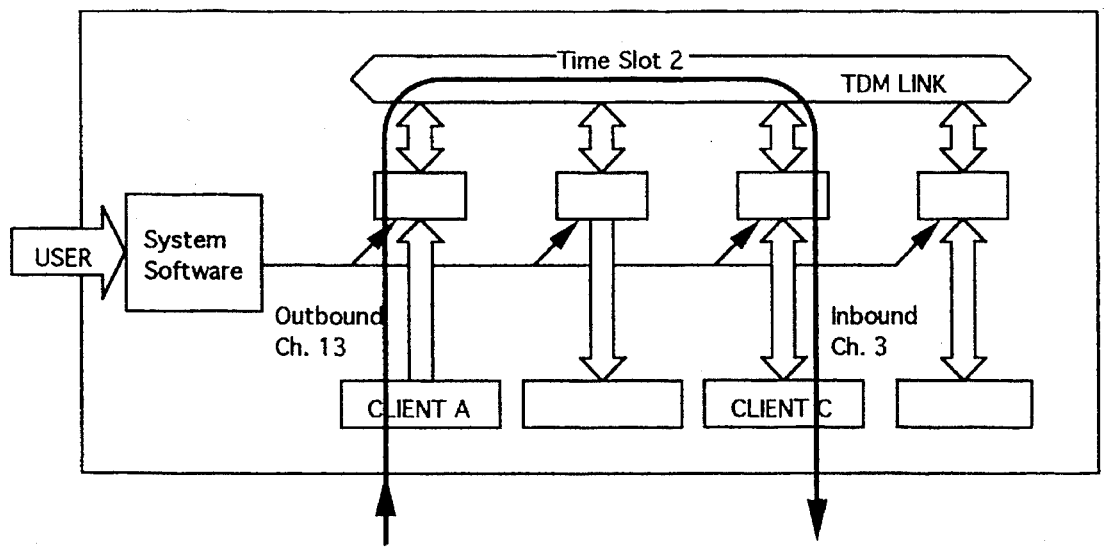
FIG. 7 illustrates the routing of a signal from a "Client A" (outbound Channel 13) out onto the TDM Link (on Time Slot 2) and from there to a "Client C" (Inbound Channel 3)

The system software makes a crosspoint connection through the TDM matrix by programming both ends. A "talker" is assigned to a particular time slot at one end, and a "listener" is assigned to the same time slot at the other end. For example, if one desired to connect Client A's Outbound Channel 13 to Client C's Inbound Channel 3, the system software would first look through its Table of Available Time Slots, which it maintains as connections are made and broken during run-time operation. If, for example, it finds that Time Slot 2 is available, the system software then tells Client A's TDM Interface to make a connection from Outbound Channel 13 to TDM Time Slot 2. Next, it tells Client C's TDM Interface to make a connection from Time Slot 2 to Inbound Channel 3. From this point on, any signal leaving via Client A's Outbound Channel 13 will arrive at Client C's Inbound Channel 3, after having traveled via TDM Time Slot 2 (see FIG. 7).

Figure 8:
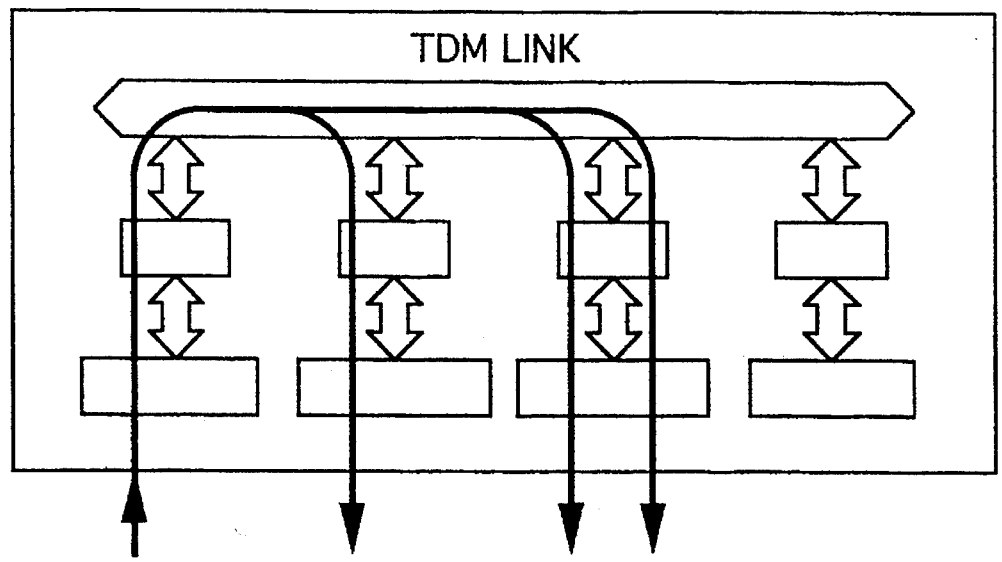
FIG. 8 illustrates the routing of a single outbound signal to be received on three distinct inbound channels (two of which are associated with the same "Client")
Figure 9:
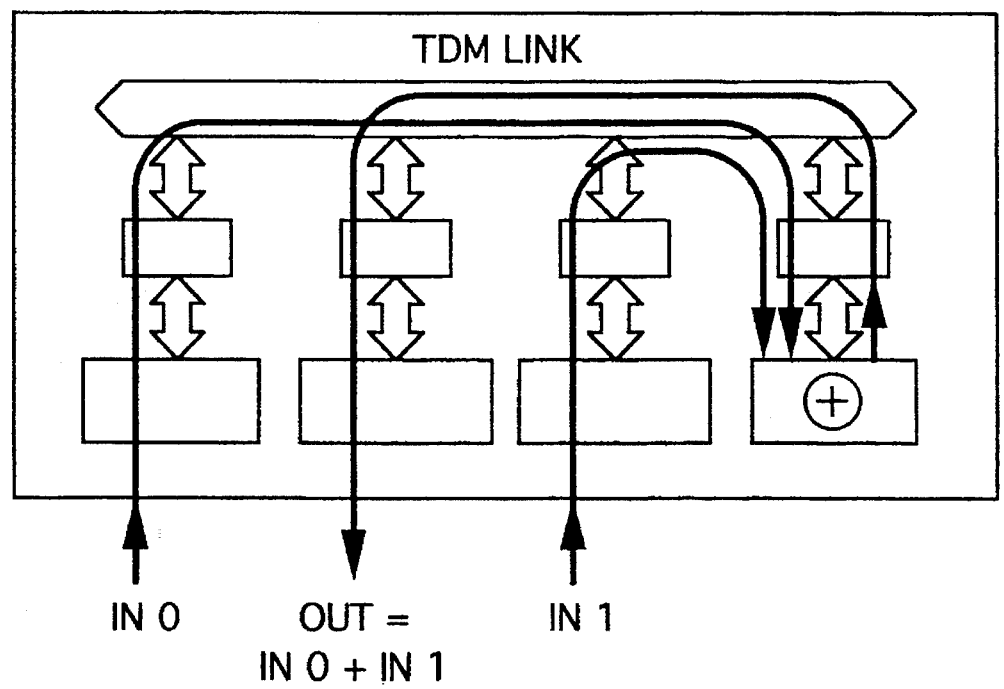
FIG. 9 illustrates the mixing of two output signals (OUT 0 and OUT 1) by an accumulating processor to create a signal received as an input equal to the sum of the two outputs.

It should be noted that Y-Connections (one to many) can still be made, using just a single Time Slot, by programming one talker and multiple listeners. FIG. 8 shows Client A's output signal being received by an inbound channel of Client B and by two inbound channels of Client C. It is not legal, however, to route multiple "talkers" onto the same Time Slot (many to one). A proper way to do this would be to include somewhere in the system a Throughput Processor Client running an accumulating mixer, as shown in FIG. 9. The signals to be combined ("Out 0" from Client A and "Out 1" from Client C) are routed over the TDM to the mixer Client, which will pull them off the TDM and mix them together to compute a sum signal. The sum signal is then put back out on the TDM (on a different Time Slot) where it makes its way to destination Client B where it is received as an input signal ("In").

Thus, a TDM-based crosspoint architecture really has no centralized matrix hardware. The switching matrix is distributed; there is a part of it on every Client (in the form of the Client's TDM interface port). Whereas an analog crosspoint matrix must grow geometrically larger in response to increases in system capacity, a TDM architecture does not. A TDM link has a single conducting path or bus, and only the frequency of data transfer across the TDM must increase along with system capacity. From a hardware standpoint, extra TDM Time Slots are "free" until the bus frequency reaches a limit beyond which a technology change is required (for example from relatively inexpensive CMOS to more expensive ECL beyond 50 MHz or so). Thus, a system can be designed with a relatively large number of TDM Time Slots, but the user does not have to purchase "client" hardware for all the Time Slots—rather, the user can configure a system according to their present needs, and later expand the system by merely buying more client hardware as needed.

Figure 10:
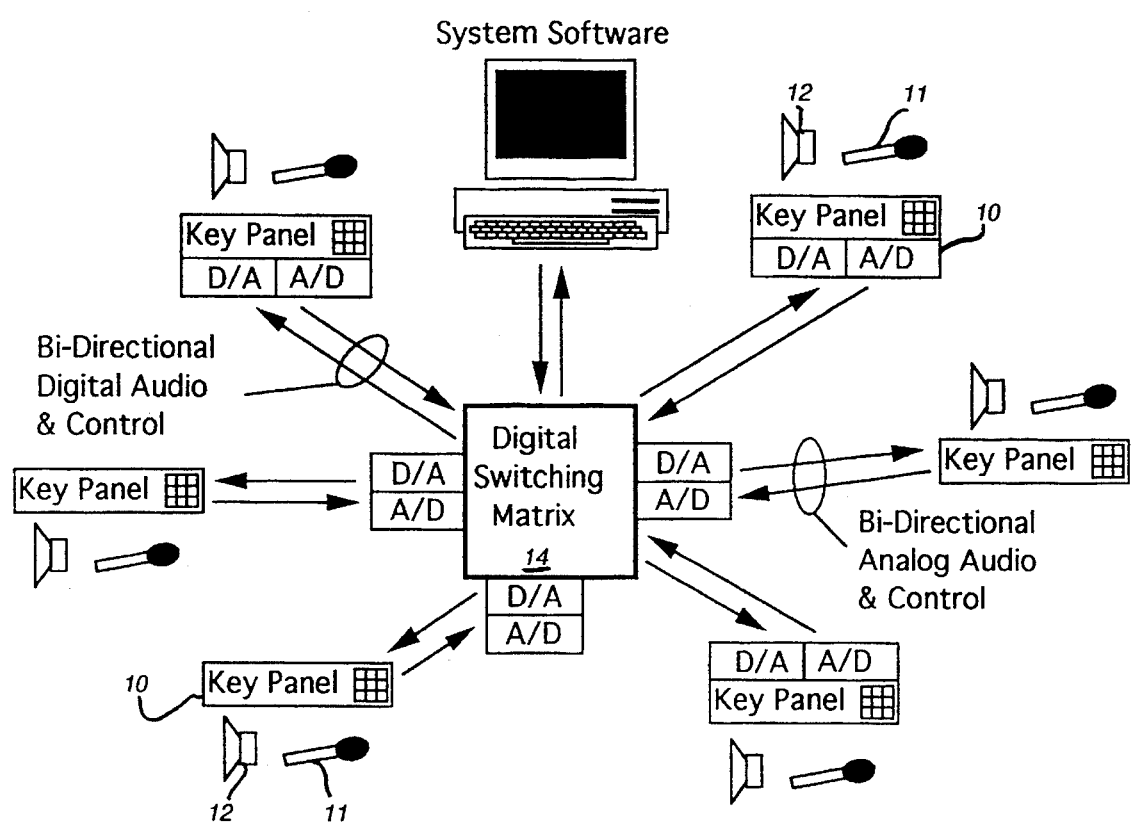
FIG. 10 is a schematic representation of an intercom system of the invention.

FIG. 10 shows schematically an entire intercom system of the invention, with keypanel stations 10 geographically distributed throughout an area the size of a building, for example. Each keypanel station in this illustration has a microphone 11 and a speaker 12, and so is both a source and destination of audio communication signals (though the system could be utilized with some stations having only a microphone, or only a speaker). In addition, Talk and Listen keypresses at the keypanels may be utilized, and Incoming Call messages may be sent from the central switching matrix 14 to the keypanels; thus, bi-directional control signals may be connected between each keypanel and the matrix.

In this drawing, some of the keypanels are illustrated as transmitting and receiving analog audio signals to and from the switching matrix, while other keypanels transmit and receive in digital format. Either or both types of keypanels may be used in any combination; from an architectural standpoint, the only difference is which end of the cable the A/D and D/A converters are located. In either case, the digital switching matrix itself transmits and receives digital signals to and from every keypanel interface.

Other types of devices may also be connected to the matrix, such as camera delegate panels and telephone interfaces, etc. However, these typically will all use the same physical, electrical, and control protocol standards as the keypanels, so keypanels will be used to illustrate the structure and operation of the system of the invention.

Each keypanel station may have multiple Listen keys, any number of which may be depressed at any time. When more than one Listen key is depressed simultaneously, the keypanel station receives a mix of all the channels it has requested to monitor. In many installations, each keypanel typically will request a different mix of signals relative to the requested mixes of any of the other keypanels, so there is need for as many mixers in the system as there are keypanel destinations (or at least a mixer capable of serving all of the keypanel stations). Moreover, the invention provides the capability of allowing each keypanel to specify an audio level for each channel added to its mix. Thus, each keypanel is able to receive a weighted mix of all its requested Listen signals.

Figure 11:
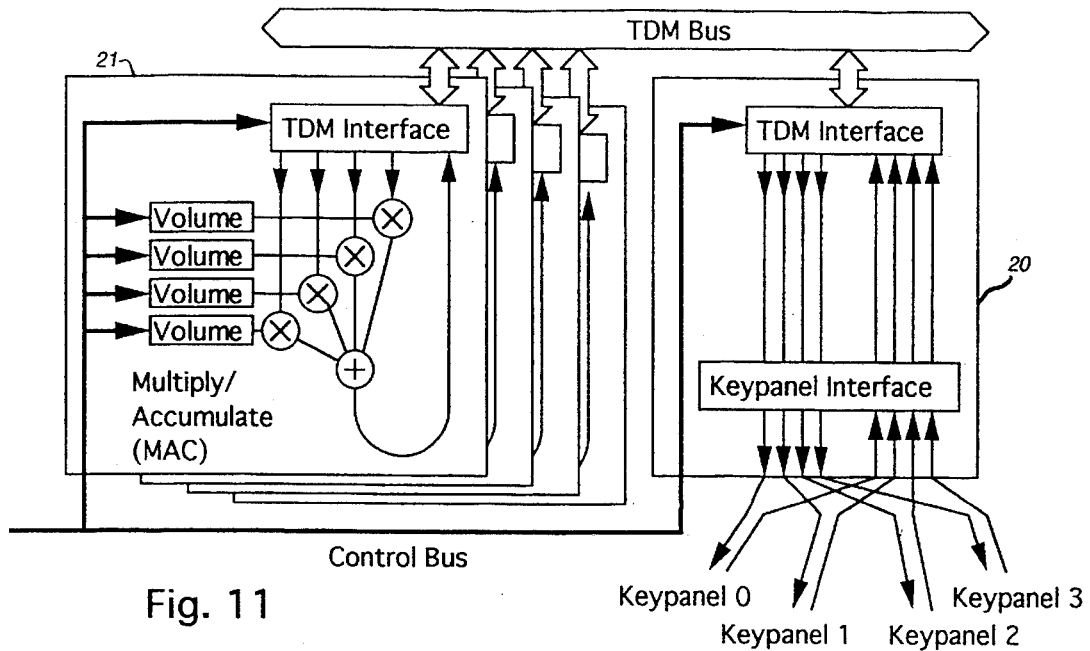
FIG. 11 is a block diagram illustrating conceptually the custom mixing of intercom signals for each of four intercom keypanels in an intercom system of the invention.

FIG. 11 illustrates a relatively simple embodiment of the invention. This illustration shows a very modest 4×4 matrix-smaller than what would ordinarily be desired for a system utilizing the invention, but it will serve to more simply illustrate certain concepts. The system includes a single four-channel Keypanel TDM Interface card 20 and four TDM mixing cards 21. There is one mixing card 21 for each keypanel in the system. The job of each mixing card is to compute the custom mix requested by its assigned keypanel. Two types of TDM Keypanel Interface cards could be utilized—one that interfaces to an analog keypanel and one that interfaces to a digital keypanel.

FIG. 11 shows that each Client has a four channel TDM Interface. This means that of the total number of TDM Time Slots out on the TDM Bus, each Client may only access a subset of four inbound channels maximum and four outbound channels maximum. The minimum size that the TDM Bus itself would have to be in order to accommodate this setup would be eight Time Slots. This number includes four Time Slots to handle the four microphone signals coming in from the keypanels and four more Time Slots to handle the four custom mixes going back out to the keypanels.

The mixing cards operate by obtaining the four microphone input channels from the TDM and multiplying each one by an attenuation factor (i.e., a volume level, which may either be pre-set by the System Software via a control bus, or may be set in response to a volume level request received from the listener keypanel and communicated to the mixing cards through the control bus). Then the post-attenuated signals are all added together in an accumulator. For purposes of illustration, FIG. 11 shows four parallel multipliers.

Figure 12:
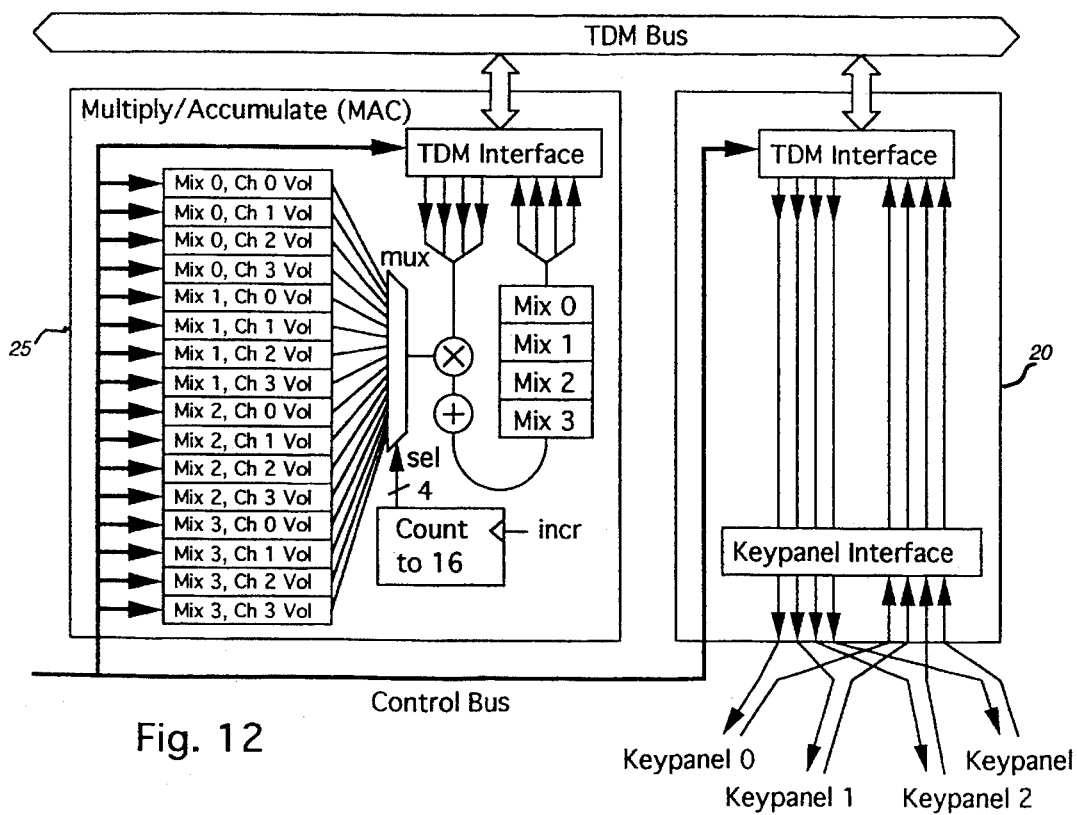
FIG. 12 is a block diagram of an alternate hardware configuration for the custom mixing of intercom signals for individual keypanels.

Alternately, however, the hardware configuration shown in FIG. 12 may be utilized. In this configuration, a single multiply/accumulate circuit is utilized to accomplish all the requested mixing. The first mic channel is obtained from the TDM interface, multiplied by its volume level and put into an accumulator. Then the second channel is obtained from the TDM, multiplied by its volume level and put into the accumulator. This process continues until the accumulator contains the weighted mix of all the input signals, i.e., it contains the next sample of the first output mix signal. This resulting sample is put into temporary local storage (i.e., a buffer) and the accumulator is cleared. Then the process is repeated for the second mix, one channel at a time, and, in sequence, for the third and fourth mixes. At the beginning of the next Frame, the results are moved to the TDM Interface for transmission, the accumulator is cleared, and the process starts over. Thus, each sample of the output signal is a point-by-point weighted combination of the four input signals.

Since the multiplying function in this configuration takes place sequentially in pipeline fashion, only one hardware multiplier is necessary. This is a more compact hardware solution, containing only one mixing card 25 for all four keypanel mixes. The pipeline mix sequence starting at the beginning of a TDM Frame thus is as follows:

Transfer the four mixes (calculated in the previous frame) to the TDM Interface.

Clear the accumulator, set the Mux Select lines to zero.
    Get Ch. 0 from the TDM, multiply it by mux output (Mix 0, Ch. 0 Volume), put result in accumulator.
    Increment the mux select lines (to 1).
    Get Ch. 1 from the TDM, multiply it by mux output (Mix 0, Ch. 1 Volume), put result in accumulator.
    Increment the mux select lines (to 2).
    Get Ch. 2 from the TDM, multiply it by mux output (Mix 0, Ch. 2 Volume), put result in accumulator.
    Increment the mux select lines (to 3).
    Get Ch. 3 from the TDM, multiply it by mux output (Mix 0, Ch. 3 Volume), put result in accumulator.
    Increment the mux select lines (to 4).

Transfer accumulator to Mix 0 storage.

Clear the accumulator.
    Get Ch. 4 from the TDM, multiply it by mux output (Mix 1, Ch. 0 Volume), put result in accumulator.
    Increment the mux select lines (to 5).
    Get Ch. 5 from the TDM, multiply it by mux output (Mix 1, Ch. 1 Volume), put result in accumulator.
    Increment the mux select lines (to 6).
    Get Ch. 6 from the TDM, multiply it by mux output (Mix 1, Ch. 2 Volume), put result in accumulator.
    Increment the mux select lines (to 7).
    Get Ch. 7 from the TDM, multiply it by mux output (Mix 1, Ch. 3 Volume), put result in accumulator.
    Increment the mux select lines (to 8).

Transfer accumulator to Mix 1 storage.

Clear the accumulator.

This process is repeated until the end of the frame when all four mixes will have been calculated and will be in storage. Then, at the beginning of the next frame, these mixes will finally be transferred to the TDM Interface for transmission to the TDM bus (and, hence, the rest of the system).

Although the above example is a more compact system in terms of the number of TDM Clients, this 16-channel multiply/accumulator (MAC) must run four times faster than the previous four channel version. Nevertheless, this system eliminates a certain amount of hardware (i.e., three PCB's, three TDM Interface circuits, three Control Bus Interface circuits, etc.). By centralizing similar functions within single system elements while segregating dissimilar functions to other system elements, a modular system can be configured, usually resulting in lower average system cost for large systems, because builders of these systems can expand in only the required directions without being forced to simultaneously expand in others.

Much larger systems can thus be built using the invention described above. For example, low-cost CMOS technology currently operates effectively up to about 50 MHz. If the system sample rate is 44.1 kHz (a standard sample rate for much commercially available digital audio, including audio CD's) and the TDM Bus word clock is near 50 MHz, it becomes possible to handle, e.g., 1,024 Time Slots. With this many Time Slots, the theoretical maximum matrix size that can be handled by one TDM backplane is 1,024×1,024. Even a 512×512 maximum matrix size, however, would service a large intercom system. Desirably the TDM capacity should be kept above the maximum matrix size to allow for two or more processing hops per channel on some portion of the total number of channels.

Commercially available DSP chips currently are able to execute 20 million instructions per second. At a 44.1 kHz system sample rate, this number represents over 400 instructions per sample period. This number of instructions is divided among the number of channels to be processed. A multiply-accumulate (for mixing purposes) is accomplished in just one instruction, so a single DSP chip could theoretically mix 400 channels. As a practical matter, obtaining the samples from the Client side of the TDM Interface may limit the speed of such a system, but, e.g., one could compute four independent mixes of 32 channels each, for example. A 2nd-order state-variable filter (for equalization purposes) might take 10 instructions per channel. Thus, taking these factors into consideration, a single DSP could process 32 channels with relative ease. Custom hard-wired pipelines could realize even higher throughputs, even though they are somewhat more expensive.

Systems utilizing the invention thus could be customized using a wide variety of hardware and software configurations, depending on which of any number of factors are relatively more or less important, including desired cost, speed, capacity, and function. In many professional intercom system applications, however, desirable characteristics would include the ability to accommodate as many keypanels as possible, the capability to do a lot of mixing, and providing the flexibility for throughput processing such as equalization, dynamic range compression, echo cancellation for telephone interfaces, and the like. Desirably such a system is modular, with the system being highly partitioned so that individual system elements are specialists in one area of functionality, but then have maximal channel capacity in that area.

Although the system of the invention may be implemented in a wide variety of hardware and software configurations, the following discussion explores certain considerations for possible preferred embodiments of the invention.

The TDM Bus may itself be just a passive backplane. It must merely be designed so that signals can get across it in the amount of time they have to do so, and that they arrive in recognizable form. At a word clock rate of 50 MHz, for example, each signal has about 20 nsec to get across the bus and be latched in at the other side. This window may be shortened by propagation delays on both ends, so the maximum allowed travel time could be in the range of, e.g., 5 to 10 nanoseconds. Since the speed of light is about 8 in. per nanosecond, in 5 nanoseconds the signal can travel about 40 inches, which could be considered an upper limit on the maximum bus length. The bus should be properly terminated to minimize reflections, thus preserving the leading edge speed of the backplane signals.

One significant factor in determining the maximum TDM word clock rate and hence the maximum number of system Time Slots is the TDM Interface circuit itself. The number of TDM Time Slots may be pre-determined (i.e., by the system sample rate), or, in a preferred embodiment, it may be set up as a system parameter that can be determined after the hardware has been designed and built. In the latter case, each TDM Interface circuit is provided with a counter which is incremented by the Word Clock coming directly off the TDM bus. This counter is called the Time Slot Counter, and it tells the interface the number of the Time Slot that is currently active out on the bus. To make a connection on the TDM bus, the system software tells a source TDM Interface to "talk" on a certain Time Slot, and it tells a destination TDM Interface to "listen" on that same Time Slot. This scheme requires that each TDM Interface be in agreement with all the others as to which Time Slot is active on the TDM bus at any given time.

Figure 13:
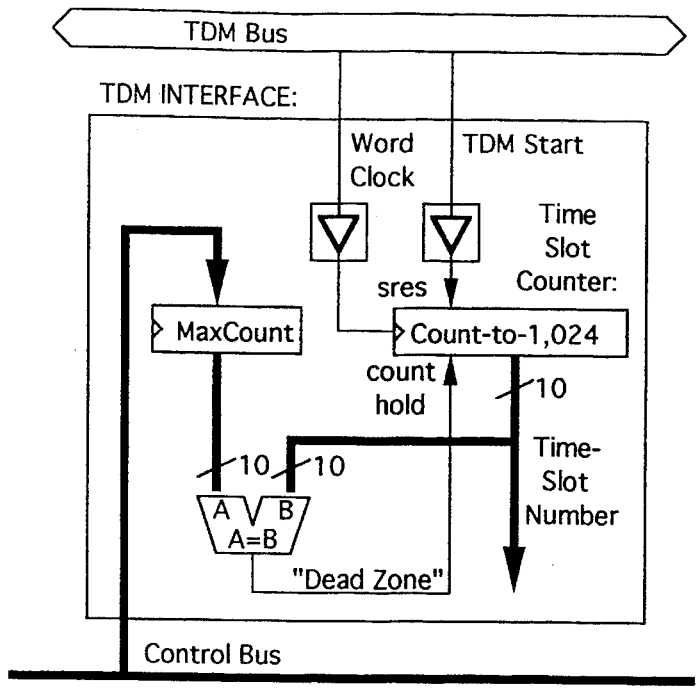
FIG. 13 illustrates a TDM interface counter usable in conjunction with the system of the invention.

To insure that this is the case, a second line may be sent across the TDM Bus named "TDM Start" (see FIG. 13). This signal is active in just one Word Clock period per sample period, and is used to define the beginning of each TDM Frame. All of the TDM Interfaces can be obligated to use this signal to synchronously reset their respective Time Slot Counters. In this way, each TDM Interface's counter is reset at the same instant, and they all track each other from that point on. Only one of the TDM Interfaces in the system is required to be the driver of this signal, but all of the interfaces receive it.

Every TDM Frame may include some overhead time at its end for synchronization purposes. Upon receipt of TDM Start, every TDM Interface resets its Time Slot Counter. Then these counters are all incremented in parallel by each ensuing Word Clock. They will come to the end of their counts well before the end of the Frame; each interface also includes a register called MaxCount, which is programmable via the System Software. The number stored in MaxCount dictates to the TDM Interface which Time Slot is to be the last valid one in the Frame.

Each time the Time Slot Counter increments, the TDM Interface checks to see whether MaxCount has been reached. To do this, it simply compares the number given by the Time Slot Counter with the number contained in the MaxCount register. If they are equal, then the current Time Slot is the last in the Frame. At this point the counter sets the Dead Zone flag to remind itself (in the remaining Word Clock periods still to elapse before the end of the current Frame) that it has already processed the last valid TDM Time Slot.

During the Dead Zone time, the TDM Interface no longer allows the Time Slot Counter to increment, so the current Time Slot Number continues to match the number in MaxCount and the Dead Zone flag continues to be set. The interface is completely locked up until the arrival of the next TDM Start pulse which resets the Time Slot Counter and clears the Dead Zone flag.

The inclusion of the programmable MaxCount register is what eliminates the requirement of determining the maximum number of TDM Time Slots per Frame. Basically, a "target" number of Time Slots can be selected and designed for. Simulations will allow one to determine whether the number is reasonable. The MaxCount register will power up with the target number as its default. If the prototype hardware is functionally OK but unable to keep up with the target speed, MaxCount may simply be set lower. At this point Word Clock may be slowed down so that a lesser number of Time Slots occupies the same Frame Time.

The TDM Bus thus may be designed such that its Word Clock Rate is "programmable", and, therefore, asynchronous relative to the system sample rate. This allows it to accommodate whatever maximum capability the TDM Interface happens to have. In other words, the Word Clock rate may be set optimally for the interface, after the interface hardware has been designed. Actual interface hardware may then be tested for its maximum capacity, and the bus may be set accordingly. This same freedom may be exploited when choosing the maximum channel capacity of TDM Client cards. The TDM Bus, should, of course, have a rate that is at least as fast as the system sample rate, and preferably a little faster.

In a preferred embodiment, the TDM bus is designed to be 24 bits wide. A full 24-bit word will be broadcast across the bus in every word clock. At a word clock rate of 50 MHz, the total bus bandwidth thus is 1.2 Gigabits/sec. Although other bus widths may be used, a 24 bit width is desirable for the following reasons. Audio signals from intercom stations preferably will be converted by analog-to-digital converters in the keypanels to a width of 16 bits. Mixes of 256 channels of 16-bit audio can be passed without rounding or truncation. Also, 24 bits is the natural word width of many popular audio DSP chips.

The Client card preferably should be designed to accommodate an arbitrarily high number of channels, but at some point the TDM Interface will not be able to run fast enough to deliver channels to the Client card in a timely manner. The TDM Interface's channel capacity may also be constrained in that it must internally store the Time Slots it pulls off the TDM before delivering them to the Client as Channels. The reason for this is that the signals a Client uses will generally be numbered as Channels by the Client in a different order than they are transmitted across the TDM bus as Time Slots. Re-ordering can not be done without temporary storage.

Figure 14:
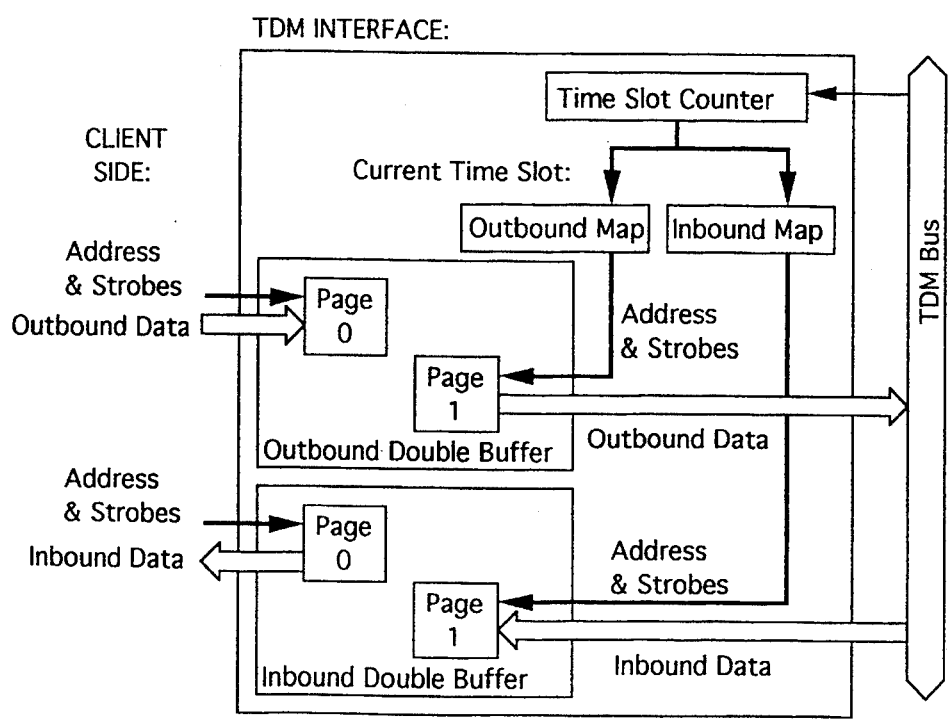
FIG. 14 illustrates a TDM interface double buffer usable in conjunction with the system of the invention.

Of the two constraints on the TDM Interface's Client-side channel capacity—speed and memory—memory is most likely the constraint that will be hit first, at least in the preferred embodiment being currently discussed. Preferably the TDM Interface uses a page-flipped double buffer scheme in each of the two directions—inbound and outbound— between the Client and the TDM bus. In each direction there are two pages of channel buffers. See FIG. 14. The Client gets a page for each direction, and the TDM gets a page for each direction. This arrangement lasts for one TDM frame, and then the two sides trade pages (i.e., the pages "flip"). The page that the Client writes to in one TDM frame will be dumped out onto the bus in the next TDM frame. The signals that are transferred across the bus in one TDM frame will be being read by a destination Client in the next TDM frame. Thus, it takes two TDM frame times for a signal to be sent across the TDM, and consequently there are four pages of channel storage in all. Each word of storage is 24 bits wide to match the TDM bus, and with four locations per channel, 96 bits are required for every channel of capacity specified. A 64-channel TDM Interface thus requires 6,144 bits of storage. In addition, the TDM side of the preferred TDM Interface uses mapping tables to make the connections between Client-side Channels and TDM-side Time Slots. A separate table is required for the inbound and outbound directions. At least two table formats are possible:

(1) The first format requires a word of storage for each Time Slot. The Time Slot Counter is used to address the table, and if the current Time Slot is one in which a TDM transfer is to be made by this TDM Interface, there will be a valid channel number in the table.

If there is a valid channel number in the current Outbound Map, it instructs the TDM Interface to read the sample at this channel number from the Outbound Channel Buffer and send it out to bus in this Time Slot. If there is a valid channel number in the current Inbound Map, it instructs the TDM Interface to pull in the current Time Slot from off the bus and write it into the Inbound Channel buffer at that location. An interesting case is when there is a valid channel number in both the Inbound AND Outbound Maps. This is how a TDM loop-in is accomplished, which is necessary to sequentially chain a signal through two processes occurring on the same Client.

If a Time Slot is not one in which a TDM transfer is to be made, then there will not be a valid channel number in either map. This means that one of the channel numbers will have to be sacrificed (typically the highest numbered one) so that it may be recognized as the "No Connection" code. Alternatively another bit of storage could be assigned in each direction as a "Valid Channel" flag.

The width of each word is the number of bits required to express the number of channels. For example, a 64-channel interface would have a table word width of 6 bits (Channel 64 cannot be used, however). A 63-channel interface then requires 1024 words×6-bit words×2 directions=12,288 bits of table storage. A true 64-channel interface requires 1,024 words×7-bit words×2 directions=14,336 bits.

(2) A second possible map format requires a word of storage for each Channel but has a wider word and requires sorting and an external "hit" detect circuit. This type of map must be sorted in order of ascending Time Slot. Each word of storage stores the Time Slot AND the Channel number together. At the beginning of a frame, a Next Up counter is set to zero. It points to the first table entry. The Time Slot number stored in that location is compared to the current Time Slot until there is a "hit". At this point the Channel number indicated in the second part of the Map word is accessed in the Channel Buffer and connected to the TDM. Then the Next Up counter is incremented, pointing to the next table entry which will be waiting for a higher numbered Time Slot. The End Of Table is indicated by the first entry whose Time Slot number is not higher that the previous entry's.

The number of bits in a word is equal to the number of bits required to express the number of Time Slots plus the number of bits required to express the number of Channels. For example, a 64-channel interface connected to a 1,024 channel TDM requires 10+6=16 bits of storage per channel. The total map storage requirement is thus 64 words×16-bit words×2 directions=2,048 bits. This requires much less memory than the previous scheme, but this scheme requires 2 counters, 2 comparators, and is not as easily edited by the System Software because if an entry needs to be inserted or deleted in the middle of the list, the entire list from that point to the end must be updated.

If instant map editing is required, it is possible to add a second table which allows the table to be un-sorted but tells the TDM Interface which order it is to proceed through the table such that the Time Slot numbers are always in ascending order. This essentially turns the table into a linked list, such that any entry may be inserted or deleted by editing just two locations. Again, one location per channel is required and the width is equal to the number of bits required to express the number of channels. So we are adding 64 words×6-bit words×2 directions=768 more bits. The total map size is still only 2,816, which is a factor of five less than the first table format.

In a particularly preferred embodiment, the TDM Interface is implemented as a semi-custom, standard cell CMOS ASIC (application specific integrated circuit), described below. The TDM ASIC becomes the switching core of the intercom system. In order to connect a "talker" intercom with a "listener" intercom, the system software programs the connection into one or more of the TDM ASICs in the system.

In this preferred embodiment, the intercom system consists of some number of intercom Keypanels and a "matrix box" to interconnect them all. These Keypanels are the user sites in actual operation, and are the actual sources and destinations of audio. The matrix box itself does not have a matrix of switches, but consists of a modular family of circuit cards and a card cage. Linking the cards together across the backplane is the TDM Bus, which carries all the audio channels in the system. The TDM ASIC is installed on every card that is to interface to the TDM Bus.

Figure 15:
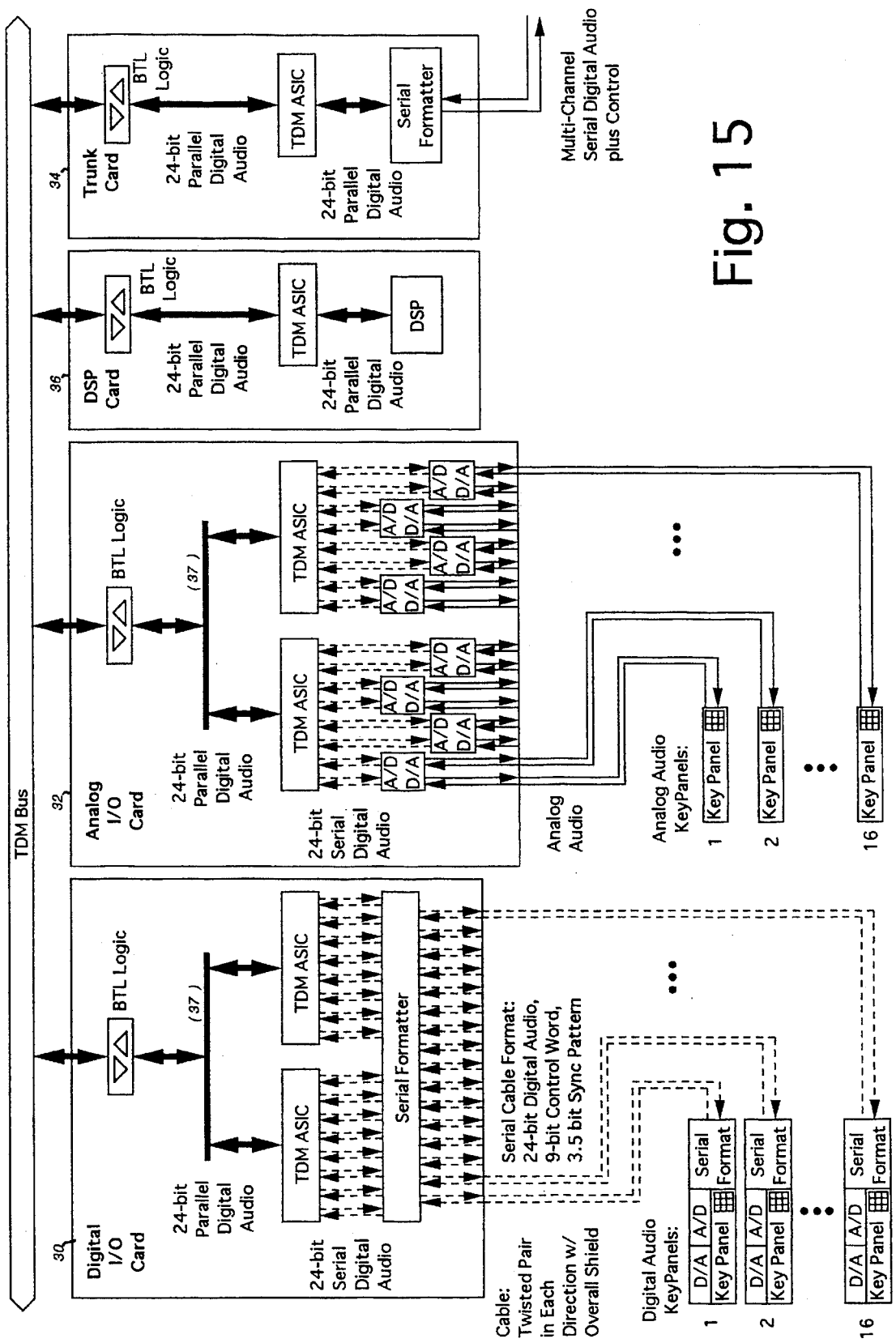
FIG. 15 is a block diagram depicting the paths of audio signals in a preferred system of the invention which utilizes some intercom keypanels which are analog and some intercom keypanels which include D/A and A/D converters.
Figure 16:
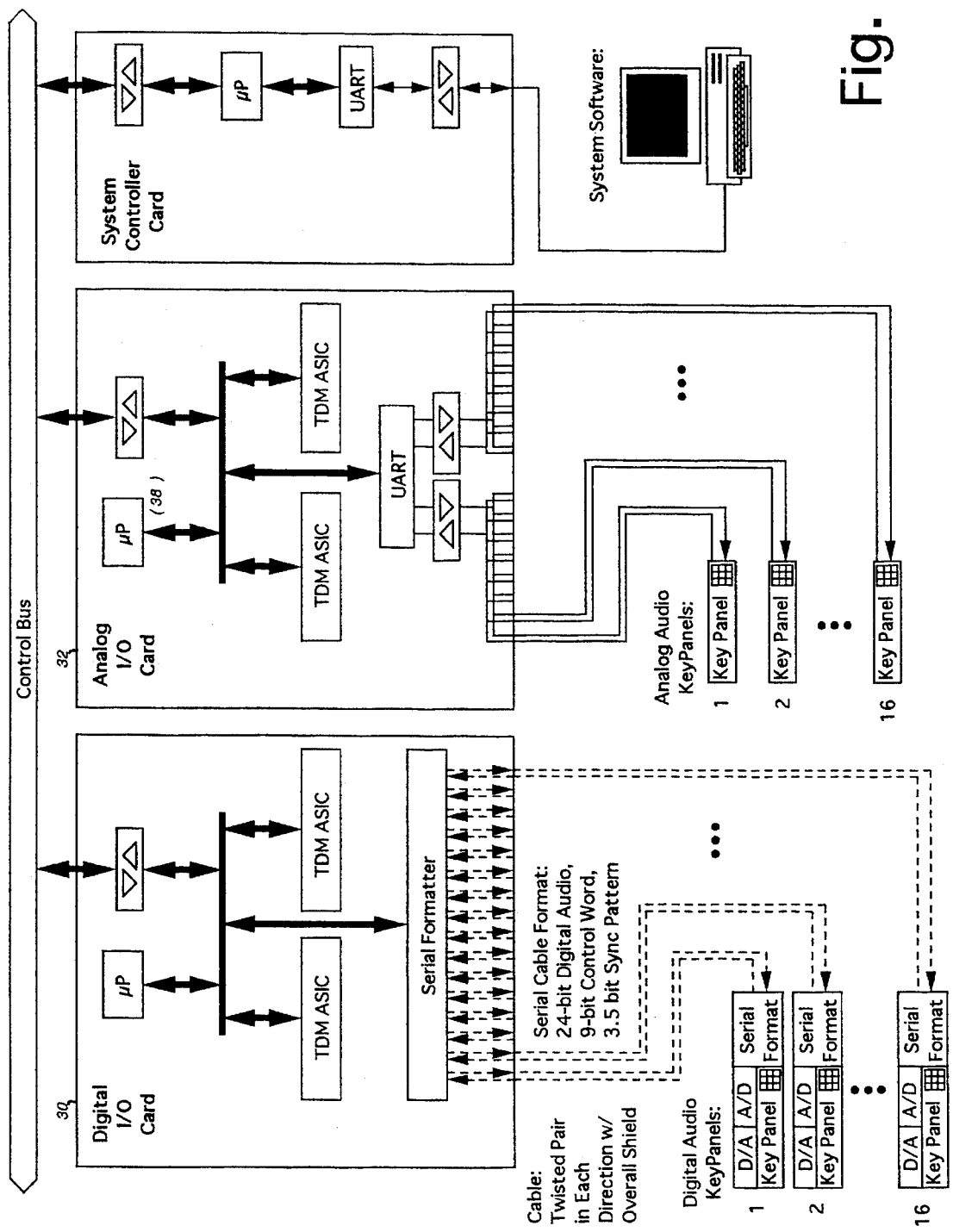
FIG. 16 is a block diagram depicting the paths of control signals in a preferred system of the invention which utilizes some intercom keypanels which are analog and some intercom keypanels which include D/A and A/D converters.

These circuit cards are called Client cards, because multiple Clients use the services of the TDM Bus. There is a different Client card for each type of Client. For example, in FIGS. 15–16 illustrate both a Digital Keypanel Card 30 and an Analog Keypanel Card 32. The system also includes a Trunk Card 34 to trunk multiple matrix cages of cards together. For example, in a system having eight users per Client Card, utilizing card cages housing 16 cards, 128 users could be served by a single cage. Another cage can be added by utilizing a Trunk Card 34 in each cage; a serial formatter sends the entire data stream from the TDM Bus of the first cage to the trunk card of the second cage, which then broadcasts the data onto the TDM Bus of the second cage, with only an extremely minor delay (e.g., 2 sample periods, which, with a 44.1 kHz sample rate, would be inconsequential to an intercom system).

The system also can include one or more DSP Cards 36, which is the only Client card that has no connections to the outside world. All the others have some connection to the outside word (i.e., microphones, speakers, etc.) in the form of a cable connector. Such cards can perform processing functions on any of the signals broadcast on the TDM, such as equalization, dynamic range compression, echo cancellation, etc.

FIGS. 15 and 16 depict Client Cards (30 and 32) with two TDM ASIC each, each TDM ASIC serving 8 Keypanels; thus, each card is depicted as serving 16 Keypanels. Current A/D converters are of a size that it is preferable to have only 8 Keypanels served per card; this is a limitation of currently available A/D converters, however, and not necessarily a system requirement. Serial formatters generally require less board space, however, making a 16 Keypanel digital I/O card more feasible.

FIGS. 15 and 16 also depict BTL circuitry being employed to deliver data from the TDM Bus to the local card data bus 37 for use by the TDM ASIC's. BTL (backplane-transistor-logic) drivers are well-known, and need not be described here in detail. See, e.g., S. Duncan, et. al, "Designing 2.1 V Futurebus+Termination System Requires System-Engineering Approach," Electronic Design News, (May 26,

1994).

FIG. 16 also depicts control signals sent to the system Control Bus by the System Software via a UART (Universal Asynchronous Receiver Transmitter) and a microprocessor (μP). System commands are sent out to the individual microprocessors 38 on Client Cards upon power-up of the system, and when other system instructions are desired to be sent. Each of the individual microprocessors 38 on the Client Cards in turn control the TDM ASIC(s) on their respective card to properly route signals to and from the TDM Bus.

Figure 17:
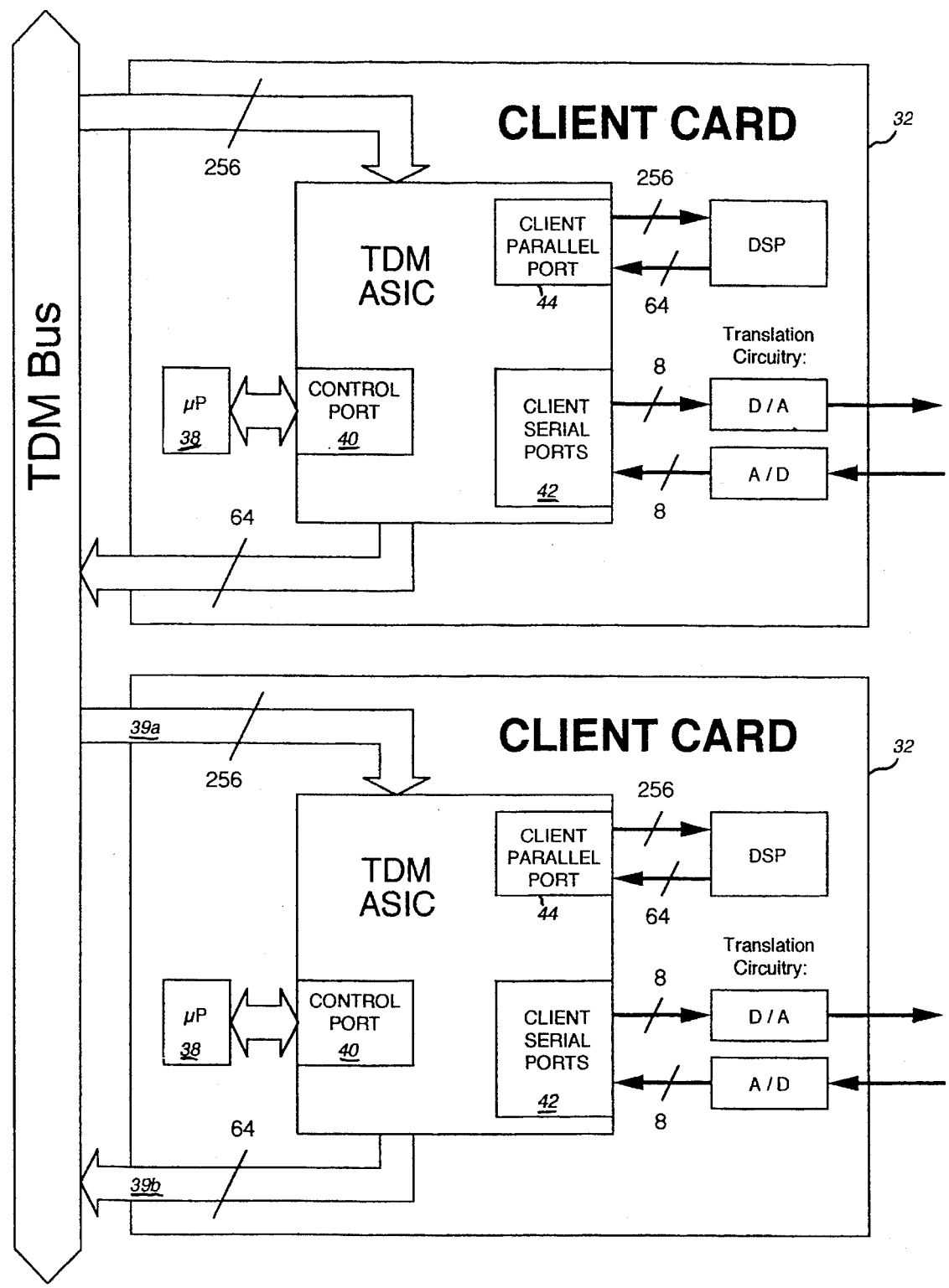
FIG. 17 is a block diagram illustrating connections of the ports of a preferred TDM ASIC utilized in a system of the invention.

Thus, the immediate environment surrounding a TDM ASIC is a Client Card to be installed in a matrix card cage. FIG. 17 illustrates a possible configuration of the Client Card. The ASIC preferably has two ports for the audio signal; one is the TDM Bus Port (39a and 39b for the input and output halves, respectively) and the other is called the Client Port. Actually, there may be two types of Client Ports on the chip—the ASIC shown in FIG. 17 includes a group of eight serial ports 42 for Keypanels and one multi-channel parallel port 44 for a DSP. While the Client Cards shown in this drawing indicate that a single card can serve both Keypanels and a resident DSP, in many systems the desire for modularity of function will dictate that cards containing DSP's not service Keypanels (so as to facilitate maximum use of such a card for DSP functions), and the cards serving Keypanels not service DSP's (so as to facilitate service to a maximum number of Keypanels). The ASIC also has a programming port or control port 40 through which the resident microprocessor 38 controls it, in response to the system software and user requests.

As indicated above, audio signals on the Client side of the chip are called Channels, audio signals on the TDM Bus are called Time Slots. From the point of view of the TDM ASIC, audio that passes through the chip from the Client Port to the TDM Port is called "outbound" audio, and audio that passes through the chip from the TDM Port to the Client Port is called "inbound". The rationale for this terminology is that the TDM ASIC sees itself as being on the edge of the card nearest the TDM Bus. From its point of view, audio coming from the bus is coming onto the card (or inbound), and audio bound for the bus is leaving the card (or outbound).

The TDM ASIC's job is to connect a number of Client Channels to a number of TDM Bus Time Slots in both the inbound and outbound directions. A secondary function of the TDM ASIC is to mix multiple inbound Time Slots into a single composite signal which may be either an inbound Channel or another outbound Time Slot. In order to do its primary job the chip needs to know which Time Slots are to be connected with which Channels. For this information the TDM ASIC references internal tables called "maps"—typically three such maps for the ASIC shown in the drawings. It is these maps that enable the chip to do its job. The maps are dynamically programmed by the system software (including the microprocessor 38) in response to user activity.

Figure 18:
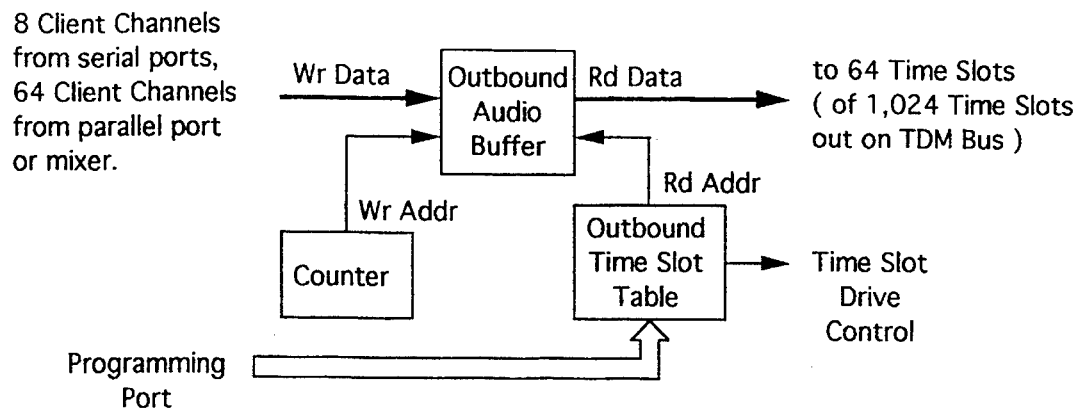
FIG. 18 illustrates the outbound audio path for an audio signal being sent from a client card to the TDM Bus.

In the preferred TDM ASIC, the three chip-internal maps to be programmed by the system software have the following functions: the first map assigns a unique Time Slot destination for each outbound Channel, the second one assigns a unique Inbound Audio Buffer Location as destination for each requested inbound Time Slot, and the last one assigns a (possibly non-unique) Inbound Audio Buffer location as a source for each inbound Channel. FIG. 18 is a simplified diagram of the outbound audio data path, showing the table to be programmed.

Figure 19:
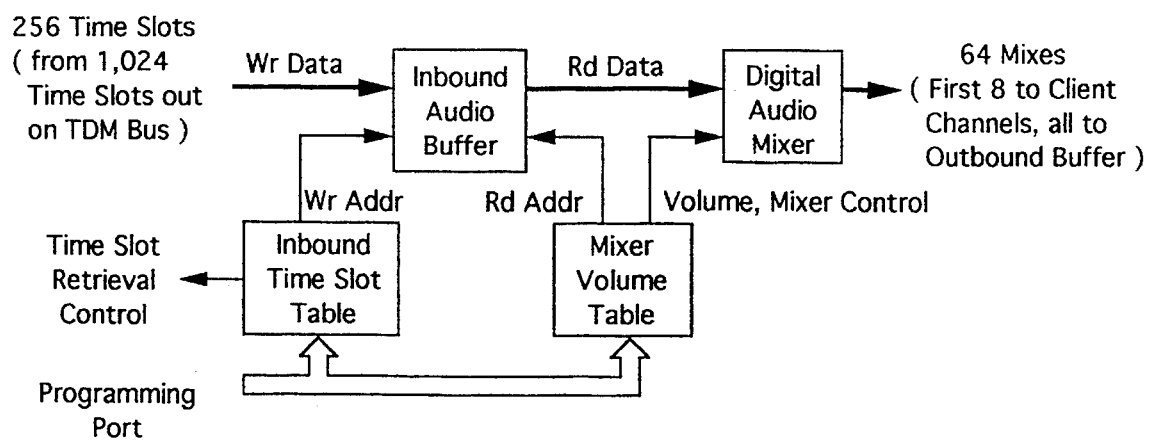
FIG. 19 illustrates the inbound audio path for an audio signal being retrieved from the TDM Bus by a client card.

The second map, for the inbound audio buffer location, must take into account the fact that there is a digital audio mixer inside the TDM ASIC. This mixer behaves very much like a built-in Client. If the parallel audio port is not being used, the mixer's operation is transparent. If the parallel audio port is being used, however, say by a DSP Card, then the external Client circuitry (the DSP) and the internal mixer must time-share the services of the audio routing portion of the chip. FIG. 19 is a simplified diagram of the inbound audio path, showing the tables to be programmed.

Figure 20:
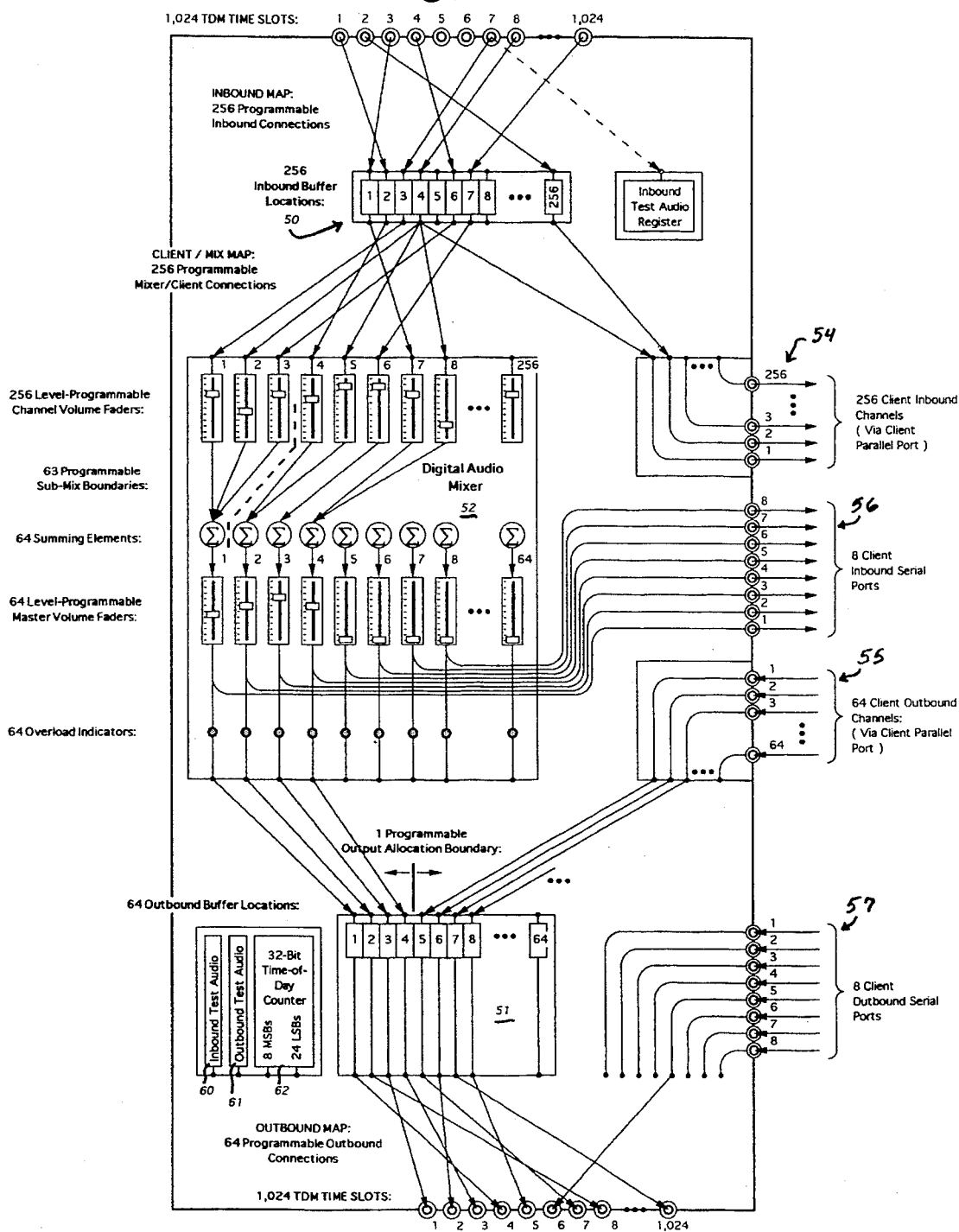
FIG. 20 depicts conceptually the internal function of a TDM ASIC usable in a system of the invention.

As indicated above, a wide variety of hardware and software combinations could be utilized to carry out the invention. FIG. 20 illustrates, conceptually, the function of a preferred TDM ASIC having the following capabilities:

Inbound Signals

Of the 1,024 signals carried by the TDM Bus, the TDM chip desirably is capable of pulling in up to 256 signals off the TDM Bus and storing them in its Inbound Audio Buffer 50. It is not necessary that the Time Slots requested be in contiguous blocks, nor is it necessary that they be discontiguous. The group of 256 requested Time Slots may be a mixed set of isolated Time Slot numbers and/or continuous blocks of Time Slots numbers, and these blocks may be of varying size. It is not necessary that all of the 256 requested Time Slots be pulled in, in fact it is not necessary that any Time slots be pulled in at all. A pulled-in Time Slot may be written to no more than a single location in the Inbound Audio Buffer 50, but it is possible to send it from there to multiple destinations elsewhere in the chip and in the system.

All 256 signals stored in the Inbound Audio Buffer may be sent to the mixer 52, and/or all 256 may be read directly through the chip's inbound parallel audio port 54. There is no Inbound Audio Buffer storage space tradeoff that needs to be made between the mixer and the parallel port; all the signals in the buffer may be read by either the mixer or the parallel port, or both, or neither. There is, however, a time tradeoff that needs to be made between the mixer and parallel port's accesses to this buffer, however. This time tradeoff applies equally to the Outbound Audio Buffer, as explained below.

Mixer

The preferred mixer is capable of computing as many as 64 output mixes. The mixer may thus be considered as 64 individual "virtual" mixers, numbered 0 through 63. Although the mixer's outputs are all created using inbound signals, the mixes can all be turned back around to become outbound signals, never seen by the Client card on which the chip is installed (unless they are later brought back in from the bus as new inbound signals). Preferably the first eight mixer outputs are unique in that they are the only ones that can additionally continue on as inbound signals readable by the Client. To accomplish this, each is hard-wired to a unique serial port destination 56. Mix 0 is hard-wired to Serial Port 0, etc.

Each input signal applied to a mix has a scaling factor, or "volume" assigned to it. This weighting factor may be, e.g., a 12-bit number yielding 4,096 possible volume levels. The levels are all attenuative, that is, the scaling factor is a number between 0 and 1. A 13th bit allows exact unity gain, and a 14th provides phase inversion (negative volume, e.g., for subtracting an individual signal from a given mix of signals). The volume attenuation is illustrated conceptually in FIG. 20 as a set of volume faders; while such a configuration theoretically could be utilized, preferably the volume attenuation and mixing is accomplished serially utilizing a single multiply/accumulate circuit as described above in connection with FIG. 12.

Because the ASIC can pull in a maximum of 256 signals off the TDM Bus, the 64 individual mixes must share a global input signal "pool" limited to 256 signals. This global input signal pool may be divided up in any proportion amongst the 64 individual mixes. The sub-group of input signals selected from the pool for application to an individual mix is called that mix's "listen group". It is not necessary that all the mixing capability be used, nor is it necessary that all 256 input signal possibilities be used. It is not necessary that the listen group size for all individual mixes be the same. That is, different mixes may have differing numbers of input signals. Listen groups for different mixes may overlap to any degree, meaning that two or more mixes may include some of the same signals, or all of the same signals, or none of the same signals. Input signals belonging to multiple mix listen groups may be assigned a different volume level in each listen group it belongs to. A signal could even be mixed multiple times in the same mix, albeit to questionable advantage (perhaps as a way to scale a signal by a factor greater than 1).

The mixer operates for only 256 clock signals per sample period, and in each clock period it can accumulate one input signal into one mix. Therefore, if all the listen group sizes are added up, the total should not exceed 256, regardless of the degree of overlap between listen groups. In other words, sending a common signal to three mixes does not allow the signal to be mixed "for free" in the second and third mixes. The signal still counts three against the total allowed in this embodiment of the invention.

The output mixes are computed in order from 0 to 63. That is, in each sample period, all the signals to be applied to mix 0 are scaled (by the figurative volume faders in FIG. 20) and accumulated (by the figurative summing elements in FIG. 20) first, then the signals for mix 1, then mix 2, etc. Although it is not necessary that all of the figurative mixers be used, no mixer may be entirely skipped if a higher numbered mixer is to be used. That is, if mixers 0 and 2 are being used and mixer 1 is not being used, mixer 1 must nevertheless be told to mix at least one "dummy" signal, which counts 1 against the total of 256 signals that may be accumulated per sample period. What this does is place a differing maximum mixing capacity on all the different mixers, as follows: figurative mixer 0 could mix 256 signals if none of the others were being used, but mixer 1 could only mix 255 signals even if none of the others were being used, due to the fact that mixer 0 would have to mix at least one "dummy" signal. Mixer 2 could mix only as many 254 signals maximum, because both mixers 0 and 1 would each have to mix one "dummy" signal each, etc. So each mixer could mix a maximum number of equal to 256, less its mixer number. It is not necessary to send dummy input signals to those mixers whose mixer number is higher than the highest numbered mixer actually being used. As indicated above, preferably there are not 64 separate mixers in the ASIC mixer, merely a single mixer sequentially performing the requisite mixes.

Outbound Signals

Of the 1,024 signals carded by the TDM Bus, each TDM chip can drive a maximum of 64 signals out across the TDM Bus. It is not necessary that the Time Slots driven be in contiguous blocks, nor is it necessary that they be discontiguous. The group of 64 driven Time Slots may be a mixed grouping of isolated Time Slot numbers and/or continuous blocks of Time Slots numbers, and these blocks may be of varying size. It is not necessary that all of the 64 possible Time Slots be driven, in fact it is not necessary that any Time Slots be driven at all. The only restriction placed on Time Slot usage is that no two TDM chips attempt to drive the same numbered Time Slot—this is the responsibility of the system software to orchestrate, not the TDM.

The 64 signals the TDM chip is capable of driving into TDM Time Slots may be sourced from 75 possible locations inside the chip. These include the chip's eight output serial ports 57, the test audio in 60, test audio out 61 and time-of-day clock 62, and the other 64 are sourced from the chip's internal Outbound Audio Buffer 51. Any mixed group of 64 of the 75 internal sources may be sent to any Time Slot, in any order, contiguously or non-contiguously.

Mixer/Parallel Port Trade-offs

The 64 locations in the Outbound Audio Buffer are divided up between the internal mixer 52 and the outbound parallel audio port 55. For example, if 64 mixes were being produced, then the parallel audio port 55 could not be used in the outbound direction. If only twelve mixes were being produced, then the parallel audio port could be used to send 52 signals out across the TDM Bus. The split point can be set anywhere from 0 to 63, but preferably it is not changed dynamically in real time. A figurative mixer always puts its output in the Outbound Audio Buffer location equal to its mix number; the mixer thus gets the lower section of the buffer starting with location zero continuing up to the number of the highest numbered mixer that is in use, including any "dummy" mixes. The parallel port's section of the buffer 51 may be set to start at any location higher than the number of the highest numbered mixer that is in use. The parallel port's Channels will be written into the buffer in ascending order from that location up.

In addition to the Outbound Audio Buffer space tradeoff between the mixer and the parallel audio port, as described above, there is also a time tradeoff between these two Clients concerning access to both the Inbound and Outbound Audio Buffers. In a system having, e.g., 1,024 Time Slots carded by the TDM Bus with no Dead Zone, the TDM Frame is divided into 1,024 clock periods. The mixer's clock runs at half this rate, so there are 512 mixer clocks per sample period, of which it is active for a maximum of 256. So if the mixer is at its capacity summing 256 signals, it would still be active for only haft the sample period. The parallel audio port could have access to the buffer for the rest of the sample period. The parallel port gets the buffers first, at the beginning of the sample period, and can use them until the mixer starts up. The mixers' start time is programmed into an internal register. If the mixer has less signals to mix than 256, its start time can be delayed, giving more time to the parallel port. If the TDM Bus were to carry less Time Slots, then there would be fewer clock periods to be divided among the two Clients. In this case the mixer would either have to mix fewer signals or start earlier. Extra Dead Zone cycles do not affect the mixer, which measure time in clock cycles, but they do affect the parallel port, which measures time in milliseconds. Dead Zone cycles take milliseconds away from the parallel port's window into the Audio Buffers. In most situations, however, the system will still have plenty of time—for most uses of the system of the invention 1,024 clock periods is a lot of time, and 256 mixer inputs is a lot of signals. Usually far fewer signals will be mixed and, using the maximum number of clock periods, there will be plenty of time available for the DSP to get access to its signals through the chip's parallel port. In any case, a preferred way to write a DSP sequence is: TDM Write (last period's outputs), TDM Read (this period's inputs), Process, & Save Outputs. This way the parallel port accesses are condensed into the beginning of the sample period by design.

The following examples illustrate possible techniques for programming the TDM ASIC's internal maps in response to a series of hypothetical user connection requests. As mentioned, every card includes a microprocessor which is responsible for maintaining the mapping functions inside its associated TDM ASIC. These processors have access to the backplane control bus, which they can use any time they need to send a message to a processor on another card. The processor changes the TDM ASIC's mapping functions in response to user keypresses at one or more of the card's eight user stations (or keypanels). In the preferred embodiment, an RS-485 serial differential line is provided to each of the user stations, in parallel. The processor polls its eight user stations for information about user key press activity, and the user stations return information only when polled.

When a user presses a "Talk" key, the processor on the Talker's card becomes aware of the key press during the very next poll of its user stations. If the Talker and Listener user stations are both connected to the same card, the processor on that card can make all the connections from Talk Channel to Time Slot to Listen Channel without assistance. It does this by making the appropriate modifications to the mapping functions inside the TDM ASIC. If, however, the Talker and Listener user stations are connected to different cards, then the Talker's processor first makes the connection from Talk Channel to Time Slot by programming its own TDM ASIC. Then it sends a message via the backplane Control Bus to the Listener's processor, asking it to make the subsequent connection from Time Slot to Listen Channel via the mixer. The listener's processor makes this connection by programming its TDM ASIC. As soon as the final connection is made, digital audio flows from source to destination through the system without further need for microprocessor intervention. The processors are then free to await further user key presses.

To start with we will consider only inbound connection requests, that is, requests from the user that we retrieve signals that are currently out on the TDM Bus and deliver these to a Client.

Assume that the user will fill out a "form" to request inbound audio signals and to specify where the signals should be sent (requests that are received and processed by the microprocessor on the board associated with the TDM ASIC). Each time the user asks for a new signal, the maps will be programmed accordingly. In this way one does not have to connect more than one signal at a time.

The signal destinations are listed down the left side of the two columns in the example tables. For each inbound signal listed, the source Time Slot and the Volume Level (at which the signal is to be mixed) are specified.

Notice that there are two types of destinations for the mixer's outputs: Serial Ports and Bus Mixes. In the preferred embodiment being described the first eight mixes are special and go both directions in "Y-cord" fashion, but the last 56 can only be looped back to become Bus Mixes (other configurations could also easily be employed). Mixes sent to Serial Port destinations eventually make their way outside the matrix card cage to intercom Keypanels. Bus Mixes loop fight back out onto the TDM Bus via the Outbound Audio Buffer and are dealt with by programming the Outbound Map. Bus Mixes will be dealt with below.

EXAMPLE 1

The user requests that Time Slot 79 be mixed at full volume and delivered to Serial Port 0. "Mix" is somewhat of a misnomer in this situation, since there is only one signal, but in general there will be multiple signals be to mixed together.

| Destination Serial Port | Destination Bus Mix | Source Time Slots & Volumes |
|---|---|---|
| 0 | 0 | 79 @ full Volume |
| 1 | 1 | |
| 2 | 2 | |
| 3 | 3 | |
| 4 | 4 | |
| . | . | |
| . | . | |
| . | . | |
| 63 | 63 | |

The first table needed to program in response to this request is the one that assigns a destination Inbound Audio Buffer location to each requested inbound Time Slot. It is called the Inbound Time Slot Table. Here's what the table looks like:

| Address | Source Time Slot | Destination Buffer Location | Link | Inbound Link 1 Reg: |
|---|---|---|---|---|
| 0 | | | | |
| 1 | | | | |
| 2 | | | | |
| 3 | | | | |
| 4 | | | | |
| . | | | | |
| . | | | | |
| 255 | | | | |

The table has 256 places for entries, each of which is organized into several fields. In addition, off to the right, there is an associated register called the First Link Register.

Each requested Time Slot requires one entry in the Inbound Time Slot Table, and there are 256 places for entries, so the TDM ASIC has a capacity of 256 inbound signal paths between the TDM Bus and its Clients. Each entry specifies three things: the requested Source Time Slot, the destination Inbound Audio Buffer location, and a link to the next entry.

All three tables inside the TDM ASIC preferably are organized as linked lists, which means that each entry contains a pointer, or "link" to the next entry. Each entry thus has a predecessor that points to it and a successor that it points to. The first entry has no predecessor, so the pointer to the first entry must be written into the First Link Register associated with the table.

This linked list scheme allows the table to be read by the chip in a different order than that in which the entries were programmed. Specifically, the TDM ASIC needs to read the entries from the Inbound Time Slot Table in order of ascending Time Slot number. This is because when it reads a new entry, it compares the requested Time Slot number with the number being output from an internal up-counter. The counter is reset to zero at the beginning of each sample period and increments each clock period thereafter. It therefore indicates which Time Slot is currently present out on the TDM Bus. The chip sits and spins, waiting for the count to compare. When the requested Time Slot number finally compares with the current Time Slot as indicated by the counter, we have a Time Slot "hit", so the chip pulls in the audio sample from the bus and then gets the next entry from the table. Since the up-counter is forever ascending, so must the requested Time Slot numbers as read from the table.

In general the user will not conveniently request signals in this time-slot ascending order. One could require that the system software sort the table after each entry, but this may introduce a considerable lag in connection response time. More importantly, the chip would have to be taken off-line while the map was sorted, interrupting audio on the signals that pass through it. Thus, the hardware linked-list approach has certain advantages. The program thus tells the chip in what order it must step through its table such that the Time Slots are read in ascending order, regardless of the order in which they actually have been entered into the table.

In the current example, the new entry is the first entry. In this example the first entry is arbitrarily written into the first location of the table, but one could have written it anywhere in the table. All that is needed is to write a pointer to the first entry in the First Link Register. Since we have chosen to write the first entry in location zero of the table, we must write a "0" into the First Link Register. This instructs the chip to start its path through the table by first reading location zero.

| Address | Source Time Slot | Destination Buffer Location | Link | Inbound Link 1 Reg: |
|---|---|---|---|---|
| 0 | 79 | 0 | 0 | 0 |
| 1 | | | | |
| 2 | | | | |
| 3 | | | | |
| 4 | | | | |
| . | | | | |
| . | | | | |
| 255 | | | | |

Since the current entry is the only entry in the table, then by definition it is also the last entry. The last entry of a linked list must somehow terminate the list. In the case of the Inbound Time Slot Table, the last entry terminates the list by pointing to any entry that requests a Time Slot number less than or equal to its own. This causes the chip's comparator to spin for the remainder of the sample period, since the up-counter's value is always higher than the requested Time Slot and there can be no further Time Slot "hits". The simplest way to make sure the last entry points to a suitable entry is to have the last entry point to itself. So a "0" has been written into the link field of location 0, such that the entry points to itself.

Finally, a zero has been written into the Destination Buffer Location field, indicating to the chip that it is to store the audio requested by this entry into the first location of the Inbound Audio Buffer. This is logical, but not required, Any entry can specify that its audio be sent to any location at all in the Inbound Audio Buffer. All one has to do for each is remember where it was sent so one can come back and pick it up again later.

Now that the first entry has been programmed into the Inbound Time Slot Table, here is what the Inbound Audio Buffer will look like:

| Address | Contents |
|---|---|
| 0 | Audio from Time Slot 79 |
| 1 | |
| 2 | |
| 3 | |
| 4 | |
| . | |
| . | |
| 255 | |

The Inbound Audio Buffer now contains an audio sample from Time Slot 79, and in every ensuing sample period from now on, the successive audio samples appearing out on the bus during Time Slot 79 will be retrieved and stored in Inbound Audio Buffer location 0.

The next thing to be done is to program the Mixer Table. This table tells the mixer where in the Inbound Audio Buffer to pick up its next audio signal, and at what volume this signal is to be mixed, not to mention which mix it is to be a part of. Here is that table, programmed according to our example:

| Address | Source Buffer Location | Volume | Accum. Term Bit | Link | Mix Link 1 Reg: |
|---|---|---|---|---|---|
| 0 | 0 | Full | 1 | 255 | 0 |
| 1 | | | | | |
| 2 | | | | | |
| 3 | | | | | |
| 4 | | | | | |
| . | | | | | |
| . | | | | | |
| 255 | 0 | 0 | 0 | 255 | |

Again, the table somewhat arbitrarily has been shown as starting with entry number 0, so a "0" must be written into the First Link Register associated with this table. Since the Inbound Time Slot Table specified that Time Slot 79 be sent to Inbound Audio Buffer location 0, we must here specify location 0 as the source for this audio signal. Since this is the only signal to be mixed, it is also the last. The "Accum. Term" bit is set to inform the mixer that this is the last signal to be mixed.

Since this is the only entry in the table, by definition it is also the last entry. It must therefore terminate the linked list. The Mixer Volume Table is terminated in a different manner than the Inbound Time Slot Table. Here we terminate the list by looping on a zero-volume entry. So the last usable entry will point to a dummy location that links back to itself and has zero volume. A further requirement of this last dummy entry is that the Accum Term bit be cleared. The effect is that after the last usable entry, the mixer spins on "nothing" until the sample period expires. Here we have arbitrarily chosen the last entry as our dummy end-of-table, but again any location could be used for the end-of-table.

The final field to be explained in the Mixer Volume Table is the Accum Term bit. This bit tells the mixer that this entry is the last signal to be added into the current mix. Upon reading a "1" in this field, the mixer will transfer its contents to the appropriate destination, clear its accumulator, and begin mixing signals bound for the next destination.

The mixer always works in the same order: first it creates the mix bound for Serial Port 0, then Serial Port 1, (etc. up to Serial Port 7) and finally the outbound Bus Mixes 8 through 63.

In the above example, there is only one entry and it is bound for Serial Port 0 so the Accum Term bit can simply be set nothing more is required. This will cause the mixer to add nothing but Time Slot 79 at full volume and then transfer the sum (which equals just Time Slot,79) to Serial Port 0. Then the mixer is sent off to spin till the end of the sample period. Thus, Serial Port 0 will be listening to the signal carded by Time Slot 79 until the maps are changed again.

EXAMPLE 2

In this example, the first signal is left connected and a second signal requested by the user is connected:

| Destination Serial Port | Destination Bus Mix | Source Time Slots & Volumes |
|---|---|---|
| 0 | 0 | 79 @ full Volume, 142 @ –3 dB |
| 1 | 1 | |
| 2 | 2 | |
| 3 | 3 | |
| 4 | 4 | |
| . | . | |
| . | . | |
| . | . | |
| 63 | 63 | |

Here the user is requesting a mix of Time Slot 142 to Serial Port 0 in addition to Time Slot 79, which is already going there at full volume.

First an Inbound Map must be created to retrieve the sample off the TDM Bus:

| Address | Source Time Slot | Destination Buffer Location | Link | Inbound Link 1 Reg: |
|---|---|---|---|---|
| 0 | 79 | 0 | 1 | 0 |
| 1 | 142 | 1 | 1 | |
| 2 | | | | |
| 3 | | | | |
| 4 | | | | |
| . | | | | |
| . | | | | |
| 255 | | | | |

The new entry is the second entry in the table, and it is written in the second location (again this is not mandatory; it could go anywhere). Since the new entry's requested time slot is higher than the earlier entry, the new entry does not take over as the linked list starting point. Therefore, the First Link Register does not need to be changed.

However, the new entry—being the second link in a list of two links—has taken over as the last link. Because of this it must terminate the list. As was discussed in the previous example, an entry can terminate the list most easily by simply pointing to itself. Therefore the new entry at location 1 has a "1" written into its Link field so that it points back to itself.

The earlier entry, written into location 0, used to be the last entry and now is not. Therefore its Link field must be updated. Whereas it used to point back to itself, it must now point to its successor, which is location 1.

This will be the general pattern in updating a linked list: the new entry is written in a blank entry location and is written such that it points to its successor (which in this case is the entry that of all those present, is the one with the next higher Time Slot number), or to itself if it is the entry which of all those present is the one requesting the highest numbered time slot. Then, its predecessor must be modified to point to the new entry. So two entries must be modified in a linked list table to add a new connection. And since them are two tables to be modified in the inbound direction, four writes total must be done to add a new connection to the system.

It is important to contrast this with the case where the table must be sorted after each entry. As long as the new entry has the highest numbered Time Slot request relative to all the existing entries, only a single write per table is required. But if the new Time Slot must be inserted into a long list somewhere, the entire table from the new entry onward must be rewritten. In the worst case this could amount to a re-write of two entire tables each of 256 entries.

In the present example, we have made the arrangements to bring the new Time Slot (#142) into the chip from off the bus, and it has been assigned to the next available location in the Inbound Audio Buffer (location 1 ), although it could have been sent anywhere. Here is what the Inbound Audio Buffer will look like after this has been done:

| Address | Contents |
|---|---|
| 0 | Audio from Time Slot 79 |
| 1 | Audio from Time Slot 142 |
| 2 | |
| 3 | |
| 4 | |
| . | |
| . | |
| 255 | |

Now the Mixer can be appropriately instructed, with two modifications to the Mixer Volume Table, as shown below:

| Address | Source Buffer Location | Volume | Accum. Term Bit | Link | Mix Link 1 Reg: |
|---|---|---|---|---|---|
| 0 | 0 | Full | 1 | 1 | 0 |
| 1 | 1 | –3 dB | 1 | 255 | |
| 2 | | | | | |
| 3 | | | | | |
| 4 | | | | | |
| . | | | | | |
| . | | | | | |
| 255 | 0 | 0 | 0 | 255 | |

Now entries are being applied to the mix bound for Serial Port 0 Left. The mixer doesn't care what order it mixes things in (i.e., within an individual mix), so the previous entry can be left as the first entry. All that is needed is to make the new entry terminate the list by pointing to the zero-volume loop and change the earlier entry so that it no longer does this, pointing instead to the entry just added. The new entry must now terminate the sub-mix to Serial Port 0, so the Accum Term bit is set and the earlier entry changed by clearing its Accum Term bit so that it no longer does this. Of course the new entry also tells the mixer where to pick up its next piece of audio and what volume level to mix it at. Now serial port 0 is receiving an audio signal which is equal to the sum of the audio signals carded by TDM Time Slots 79 and 142, just like the user requested.

EXAMPLE 3

Again in this example the first two signals are left connected and a third signal requested by the user is added:

| Destination Serial Port | Destination Bus Mix | Source Time Slots & Volumes |
|---|---|---|
| 0 | 0 | 79 @ full volume, 142 @ −3 dB |
| 1 | 1 | |
| 2 | 2 | 5 @ full volume |
| 3 | 3 | |
| 4 | 4 | |
| . | . | |
| . | . | |
| . | . | |
| 63 | 63 | |

There are two nuances to this request. First, a Time Slot number is being requested which is less than any of the previously requested Time Slot numbers, and second we are sending something to mix 2 and skipping mix 1. As usual we must first make arrangements to bring the new sample in off the TDM Bus, with the following Inbound Map:

| Address | Source Time Slot | Destination Buffer Location | Link | Inbound Link 1 Reg: |
|---|---|---|---|---|
| 0 | 79 | 0 | 1 | 2 |
| 1 | 142 | 1 | 1 | |
| 2 | 5 | 2 | 0 | |
| 3 | | | | |
| 4 | | | | |
| . | | | | |
| . | | | | |
| 255 | | | | |

The new entry requests that Time Slot 5 be pulled off the TDM bus, and the request continues with the pattern of sending the new entry's audio to the next available location in the Inbound Audio Buffer. Since the new entry's requested time slot is lower than the requested Time Slot numbers of either of the earlier entries, the new entry takes over as the linked list's starting point. Therefore, the First Link Register needs to be changed such that it points to the new entry.

The new entry must point to the earlier entry which of all those present is the one requesting the next higher Time Slot number. In this case that would be entry number 0, so a "0" is written into the new entry's Link field.

Although it was described in backwards order for this example, its very important to do the two modifications to the linked list in this order: always write the new entry into a blank location pointing to its successor, THEN modify the link of its predecessor. The consequences of doing these two operations in reverse order could cause problems in that the linked list is told to jump to an as yet unprogrammed location. In the mildest case, audio would simply stop on all channels beyond the insert point in the list; very possibly, however, the linked list could execute in the wrong order such that the audio source-to-destination connectivity of the system became scrambled.

Once again the arrangements have been made to bring the new Time Slot (#5) into the chip from off the bus, and again it has been arbitrarily assigned to the next available location in the Inbound Audio Buffer (location 2), resulting in and Inbound Audio Buffer as follows:

| Address | Contents |
|---|---|
| 0 | Audio from Time Slot 79 |
| 1 | Audio from Time Slot 142 |
| 2 | Audio from Time Slot 5 |
| 3 | |
| 4 | |
| . | |
| . | |
| . | |
| 255 | |

And, thus, the modifications to the Mixer Volume Table result in the following:

| Address | Source Buffer Location | Volume | Accum. Term Bit | Link | Mix Link 1 Reg: |
|---|---|---|---|---|---|
| 0 | 0 | Full | 1 | 1 | 0 |
| 1 | 1 | −3 dB | 1 | 2 | |
| 2 | 0 | 0 | 1 | 3 | |
| 3 | 2 | Full | 1 | 255 | |
| 4 | | | | | |
| . | | | | | |
| . | | | | | |
| 255 | 0 | 0 | 0 | 255 | |

Since the two earlier entries have been left alone in terms of their positions in the linked list (they are still first and second in the link order), the new Accum Term bit is the second one the linked list comes across. The first one is in entry number 1, and this will terminate the accumulation for mix 0, Serial Port 0. The next one happens in our dummy entry (#2) and this terminates the dummy accumulation for mix 1, Serial Port 1. Since it is a dummy accumulation, its volume has been set to 0. Then the third Accum Term bit is in entry #3, and this will terminate the accumulation for mix 2, Serial Port 2.

With respect to the Link field, the two new entries come after the earlier two in the link order, so there is no change in the list's starting entry and therefore the Link 1 Register can be left alone. But the old list terminator must change to point to the new dummy entry and the new real entry must inherit the duty of terminating the list by pointing to the zero volume loop. Serial Port 0 is now receiving a mix of the audio carried by Time Slots 79 and 142, and Serial Port 2 is receiving a "mix" consisting of just the audio carded by Time Slot 5.

If the user comes back later on and requests a signal be sent to Mix 1 (which right now is just a dummy mix of one zero-volume sample), we can just overwrite the dummy sample with the real one being requested. Since the list order does not need to be changed, it is not necessary to update the pointer of the new entry's predecessor and only one write will be required instead of the usual two. In general it takes two writes to add an entry, two writes to delete an entry, but only one write to substitute one entry for another.

EXAMPLE 4

The next example illustrates the programming in the outbound direction. The outbound direction has only one map, which looks like this:

| Address | Source Buffer Location | Dest. Time Slot | Serial Sel: | Link | Outbound Link 1 Reg: |
|---|---|---|---|---|---|
| 0 | | | | | |
| 1 | | | | | |
| 2 | | | | | |
| 3 | | | | | |
| 4 | | | | | |
| . | | | | | |
| 63 | | | | | |

Each entry in the table describes one outbound connection. Since there are 64 entries in the table, this represents the maximum number of Time Slots which can be driven by the TDM ASIC. The signals driven out into the TDM Time Slots can come from two source types inside the chip. The first source is the 64-channel Outbound Audio Buffer. The other source is the eight client outbound serial ports. The "Serial Sel" bit in each entry of the Outbound Time Slot Table is used to choose from which source type the TDM Time Slot will be driven. For instance, if the Serial Sel bit is 0 and Source Loc is 3 in a given entry, this means that Outbound Audio Buffer location 3 is to be used as the audio source. On the other hand if Serial Sel. Bit is 1 and Source Loc is 3, then Serial 3 is to be used. There are four additional sources that can possibly be selected by "SER SEL"—two of them are from the Time-of-Day counter, one is Inbound Test Audio, and the other is Outbound Test Audio.

The Outbound Audio Buffer is itself filled by one of two sources: the mixer and the Parallel Audio Port. Thus, the 64 possible outputs can be driven by any combination of the 8 possible Client Outbound Serial Ports, the 64 possible mix outputs, or the 64 possible parallel port channels.

The Outbound Audio Buffer must be shared by the parallel audio port and the mixer. The Outbound Audio Buffer has an associated register called the Wr FIFO Pre-Ld Register that determines how the buffer will be split up between these two Clients. The mixer always writes its mix outputs into Outbound Audio Buffer locations having the same number as the mix output number. For example mix 3 will always be written into Outbound Audio Buffer location 3. The mixer only writes locations up to the highest numbered mixer output that is in use, however. The parallel port places its first write data in the buffer location pointed to by the Wr FIFO Ld Register, and thereafter places each successive write data into the next higher location in the buffer.

Therefore if the Wr FIFO Pre-Ld Register is filled with a number greater than that of the highest numbered mixer output that is in use, the two Clients will utilize mutually exclusive areas of the buffer. The pointer contained in this register can be thought of as defining a boundary within the Outbound Audio Buffer shown below which the mixer stores its outputs and above which the parallel port stores its signals:

| Address | Contents | Wr FIFO Pre-Ld Reg: |
|---|---|---|
| 0 | Audio from Mix 0 | 4 |
| 1 | Audio from Mix 1 | |
| 2 | Audio from Mix 2 | |
| 3 | | |
| 4 | Audio from Client Ch. 0 | |
| 5 | Audio from Client Ch. 1 | |
| 6 | Audio from Client Ch. 2 | |
| . | | |
| 63 | Audio from Client Ch. 59 | |

In the example above, the boundary is set between location 3 and 4 by writing a 4 in the Wr FIFO Ld Register. This means that no more than four mix outputs may be used and that no more than sixty outbound parallel port channels may be used. Regardless of where the boundary is set, there is no requirement that all locations on either side be utilized, in fact there is no requirement than any of them at all be used.

There is also a time boundary that must be programmed into the Client MaxCount Register. At the beginning of the sample period, the parallel port will start filling the buffer by writing its channels from the boundary upwards. Later on in the sample period, when Client MaxCount compares with the internal Time Slot up-counter, the mixer will take over and fill from zero up towards the boundary.

EXAMPLE 5

This example illustrates sharing of the Inbound Audio Buffer between the mixer and the parallel audio port. The most important change here is that the Mixer Volume Table splits into two tables: the Mixer Volume Table for the mixer and the Client Channel Table for the parallel audio port. Actually, what happens is that the storage space that had been used for a single linked list is now used to store two independent linked lists. Within these lists, the Accum Term bit continues to serve its previous function for the Mixer Volume portion of the table, but within the Client Channel portion of the table, the Accum Term bit becomes the Mix Select Bit. Each of the two linked lists now have their own Link 1 Register, The Link 1 Register for the Mixer Volume Table is the Mix Link 1 Register. The Link 1 Register for the Client Channel Table is called the Client Read Link 1 Register.

For example, assume that the previously connected signals are to be left connected, and in addition Time Slot 33 is now to be connected to Channel 0 of the parallel port. First of all, our user "request form" will have to be modified to include space for requesting parallel port channels:

| Destination Serial Port | Destination Bus Mix | Source Time Slots & Volumes |
|---|---|---|
| 0 | 0 | 79 @ full volume, 142 @ −3 dB |
| 1 | 1 | 33 @ full volume, 79 @ −3 dB |
| 2 | 2 | 5 @ full volume |
| 3 | 3 | |
| 4 | 4 | |
| . | . | . |
| 63 | 63 | |
| Parallel Port | 0   1   2   ...   255 | |

-continued

| Channel #: Source Time Slot: | 33 | ... |
|---|---|---|

Notice that each Parallel Port Channel may have one and only one Time Slot specified as the source for its audio, instead of a list of Time Slots as in the case of the mixers. The following is the Inbound Map, making arrangements to pull in Time Slot 33, which is a new signal:

| Address | Source Time Slot | Destination Buffer Location | Link | Inbound Link 1 Reg: |
|---|---|---|---|---|
| 0 | 79 | 0 | 1 | 2 |
| 1 | 142 | 1 | 1 | |
| 2 | 5 | 2 | 3 | |
| 3 | 33 | 3 | 0 | |
| 4 | | | | |
| . | | | | |
| . | | | | |
| . | | | | |
| 255 | | | | |

This results in the following Inbound Audio Buffer contents:

| Address | Contents |
|---|---|
| 0 | Audio from Time Slot 79 |
| 1 | Audio from Time Slot 142 |
| 2 | Audio from Time Slot 5 |
| 3 | Audio from Time Slot 33 |
| 4 | |
| . | |
| . | |
| . | |
| 255 | |

The two linked lists for the mixer volume and the parallel port are then programmed as follows:

| Address | Source Buffer Location | Volume | Accum. Term Bit | Link | |
|---|---|---|---|---|---|
| | | | | | Mix Link 1 Reg: |
| | | | | | 0 |
| 0 | 0 | Full | 1 | 1 | |
| 1 | 1 | −3 dB | 1 | 2 | |
| 2 | 0 | 0 | 1 | 4 | |
| 3 | 2 | Full | 1 | 255 | |
| 4 | 3 | Full | 1 | 3 | |
| . | | | | | Client Read Link 1 Reg: |
| . | | | | | 64 |
| 64 | 3 | — | | 64 | |
| 65 | | | | | |
| . | | | | | |
| . | | | | | |
| 255 | 0 | 0 | 0 | 255 | |

The linked list for the mixer is at the top and may recognized by its Volume field entries. It also has an entry at the end of the table; this is the zero-volume loop that terminates the mixer's linked list. The linked list for the Client's Parallel Port is in the middle of the table and has its own Link 1 Register.

To explain this pair of lists we will explain the order in which the TDM ASIC steps through the table, and what happens at each step.

At the beginning of a sample period, TDM Start causes the internal pipeline to reset. At this time, Client Link 1 is used as the first link address. After this, nothing happens until the external Client reads something out of the parallel port. (The first Client read of the parallel port during a sample period is DEFINED to be Client Channel 0, the second read in the sample period is defined as Client Channel 1, etc.).

The first Client read—Channel 0—uses entry #64 since that is what entry the Client Link 1 Reg points to. Entry #64 says "use the audio in location #3 of the Inbound Audio Buffer," which contains the audio for Time Slot 33. So Time Slot 33 is mapped to Channel 0, as requested by the user.

Entry #65 points back to itself, but the Client will never come back for another channel so it doesn't matter where it points to. At some pre-programmed time given by contents of Client MaxCount in the middle of the sample period, the Mixer Active bit will come on. This causes the contents of the Mix Link 1 Peg to be forced into the linked list pointer field. Thus, even though the previously read entry points to entry #65, it is now preempted by the contents of Mix Link 1.

Next, Mix Link 1 points to entry 0 which specifies that Inbound Audio Location 0 (containing audio from Time Slot 79) be mixed at full volume. The Accum Term bit is not set, implying that there are more audio samples to be mixed into Mix 0.

Entry 0 points to entry 1, which specifies that Inbound Audio Location 1 (containing audio from Time Slot 142) be mixed at −3 dB. The Accum Term bit is set, implying that there are no more audio samples to be mixed into Mix 0. Therefore, Mix 0 is complete and is equal to the sum of the audio contained in Time Slot 79 @ full volume and Time Slot 142 @ −3 dB.

Entry 1 points to entry 2, which specifies that Inbound Audio Location 0 (containing audio from Time Slot 79) be mixed at −3 dB. The Accum Term bit is not set, implying that there are more audio samples to be mixed into Mix 1.

Entry 2 points to entry 4, which specifies that Inbound Audio Location 3 (containing audio from Time Slot 33) be mixed at full volume. The Accum Term bit is set, implying that there are no more audio samples to be mixed into Mix 1. Therefore, Mix 1 is complete and is equal to the sum of the audio contained in Time Slot 79@−3 dB volume and Time Slot 33@full volume.

Entry 4 points to entry 3, which specifies that Inbound Audio Location 2 (containing audio from Time Slot 5) be mixed at full volume. The Accum Term bit is set, implying that there are no more audio samples to be mixed into Mix 2. Therefore, Mix 2 is complete and is equal to the audio contained in Time Slot 5@full volume.

Entry 3 points to entry 255, which specifies that Inbound Audio Location 0 (containing audio from Time Slot 79) be mixed at 0 volume. The Accum Term bit is not set, implying that there are more audio samples to be mixed into Mix 3.

Entry 255 points back to itself, so in each clock period from now until the end of the sample period, the mixer will add another copy of Time Slot 79@0 volume. The mixer is effectively inactivated until the end of the sample period.

Figure 21:
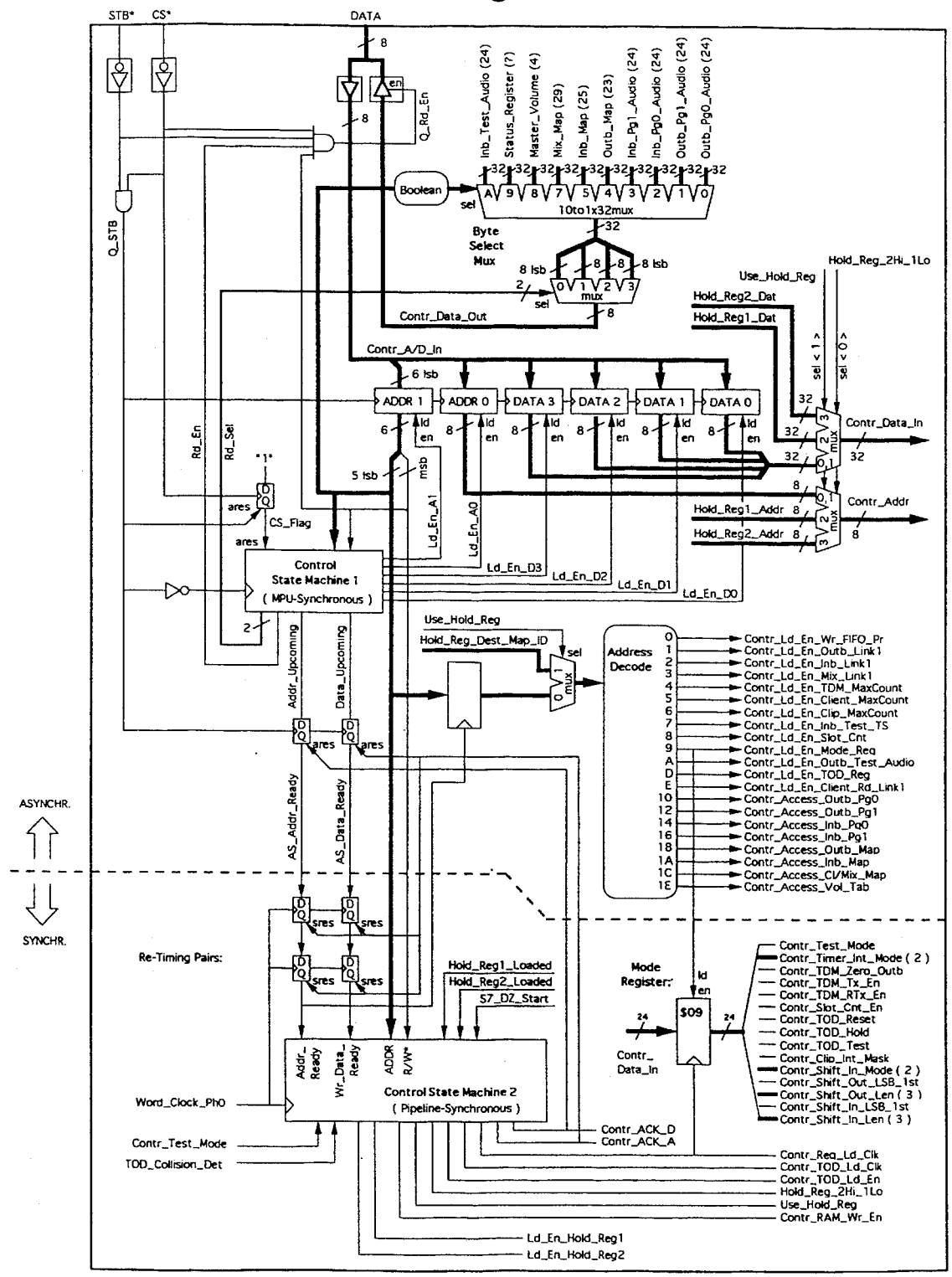
FIGS. 21–23 depict detailed block diagrams of the operation of TDM ASIC usable in a system of the invention, FIG. 21 depicting the ASIC's Control Port, FIG. 22 depicting the TDM Bus Pipeline which routes signals within the ASIC.
Figure 22B:
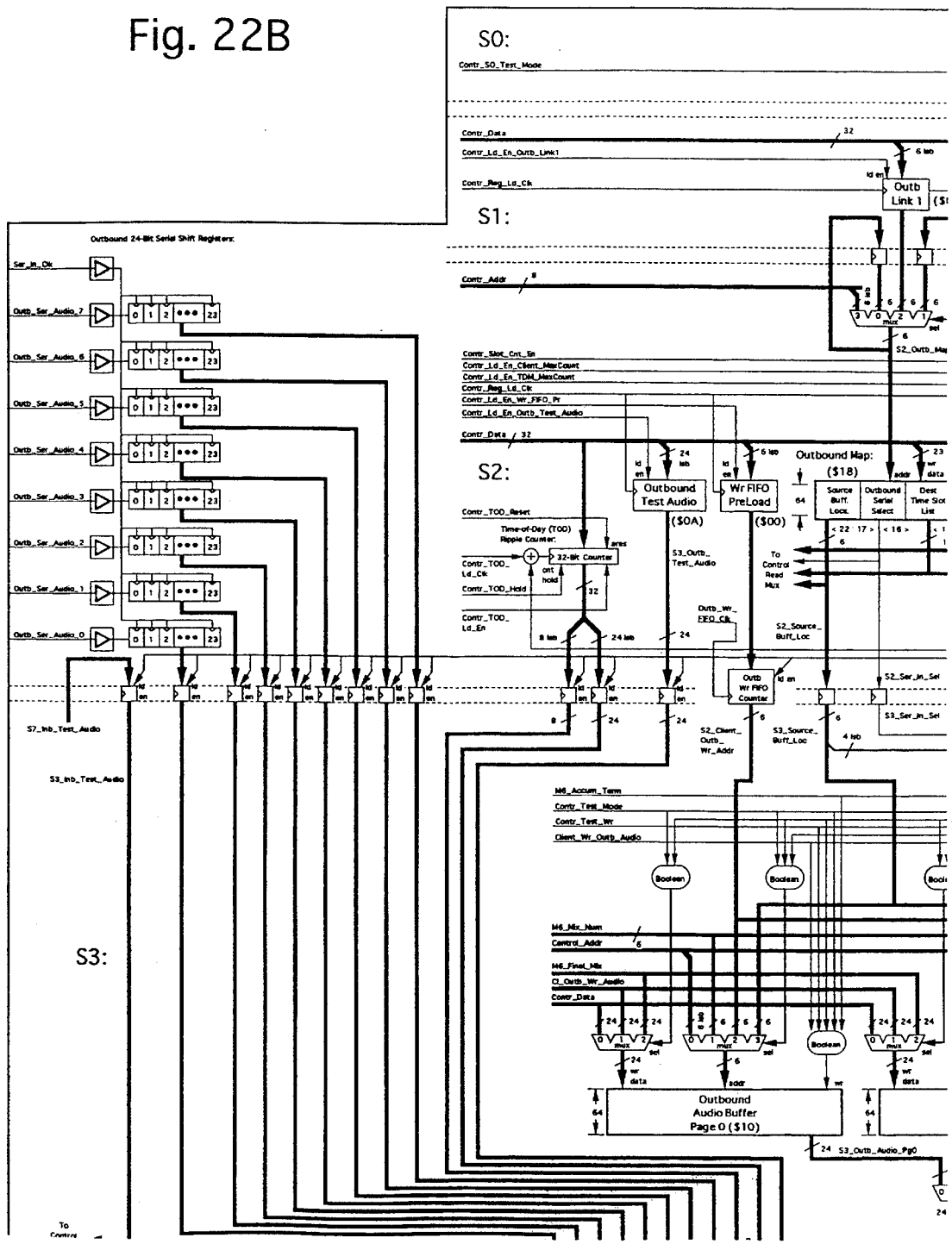
Figure 22C:
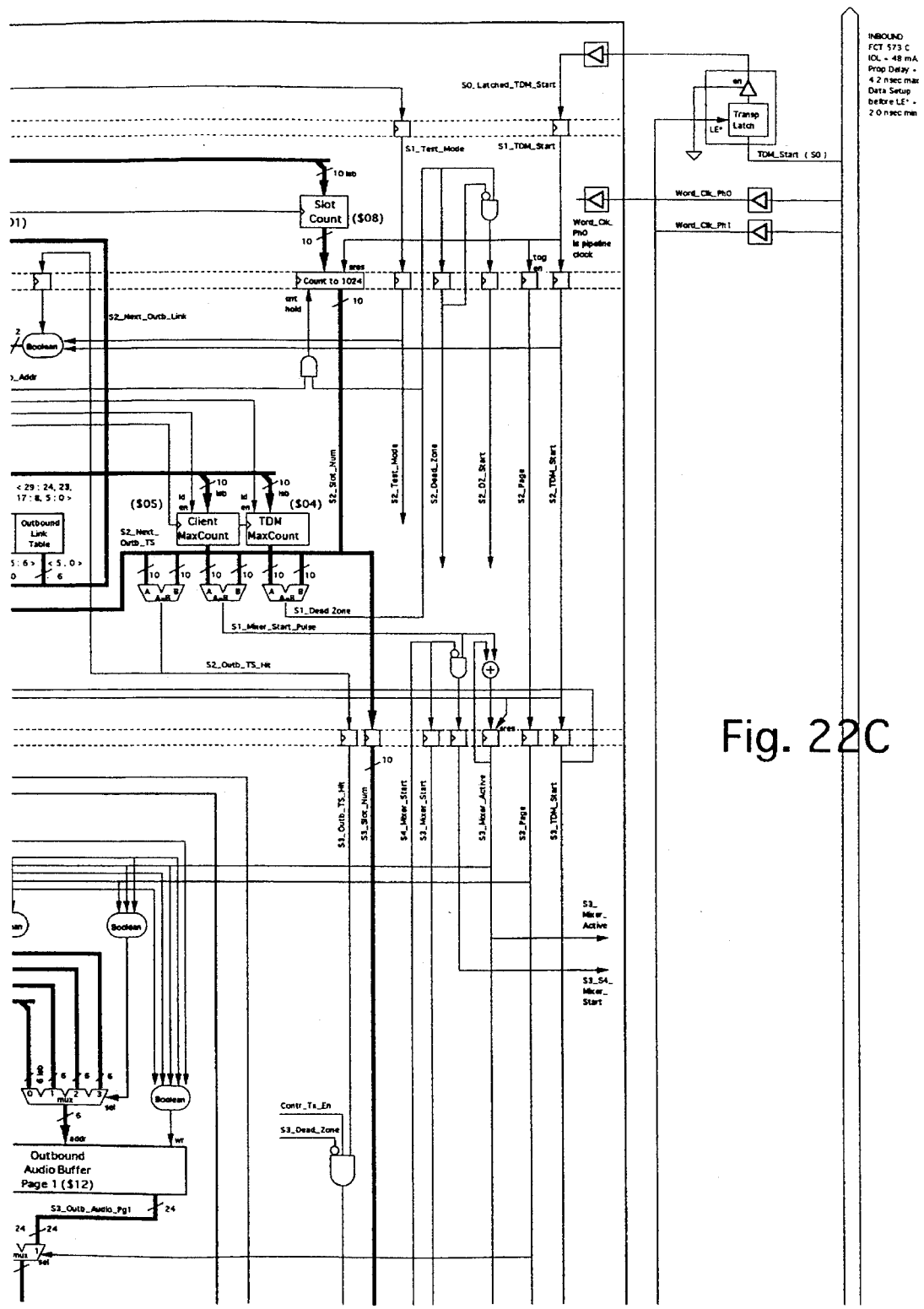
Figure 22D:
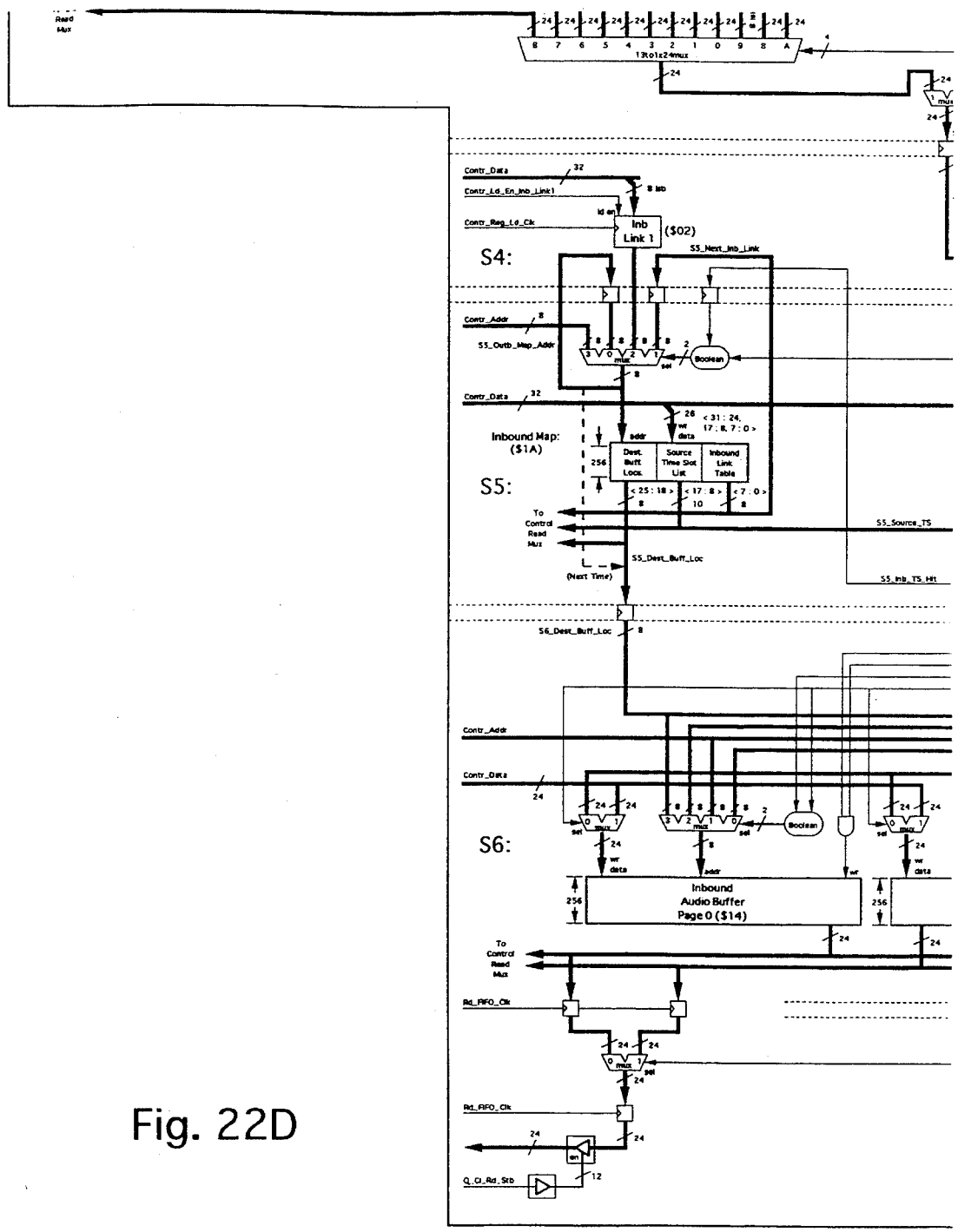
Figure 22E:
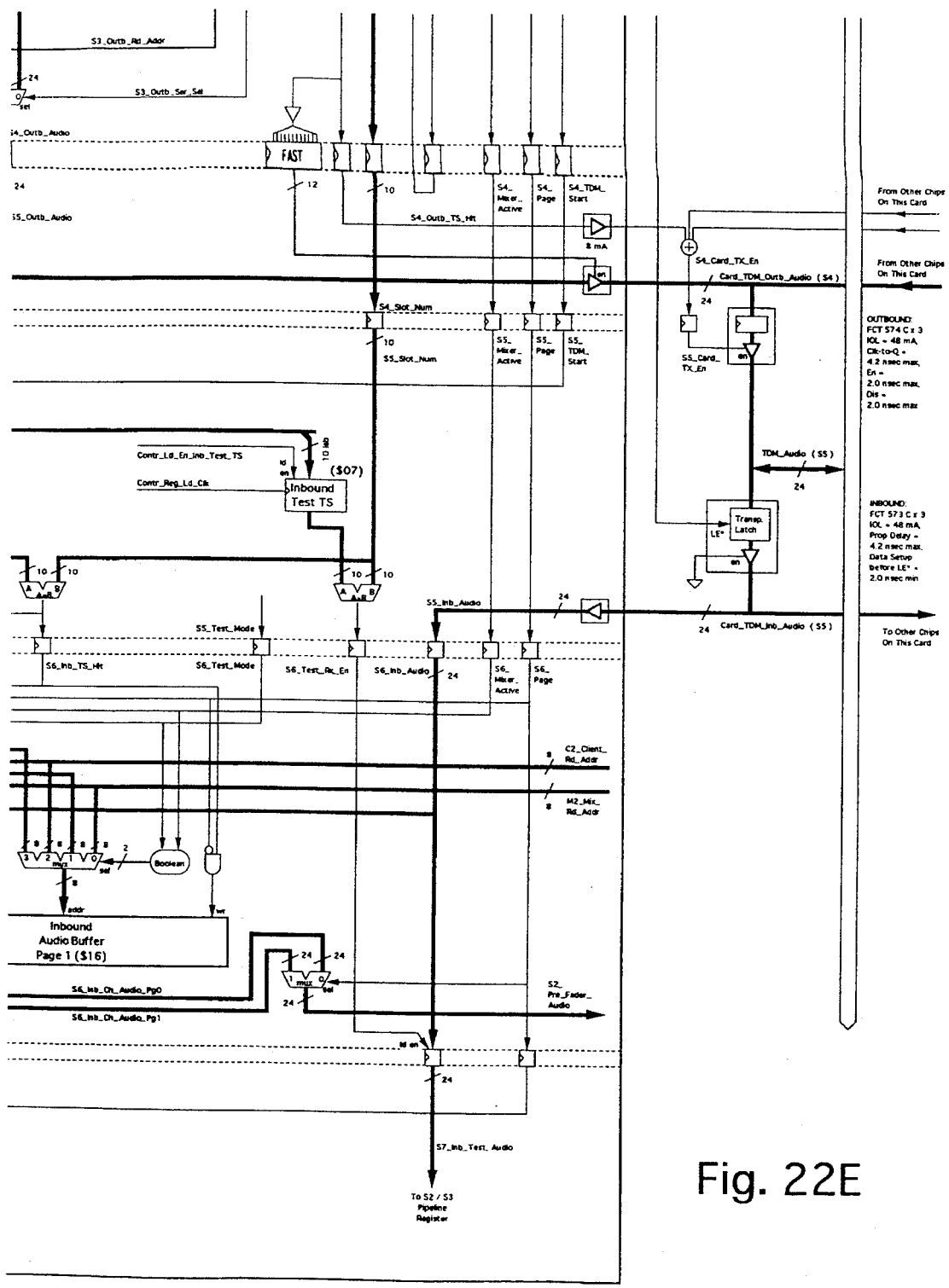
Figure 23B:
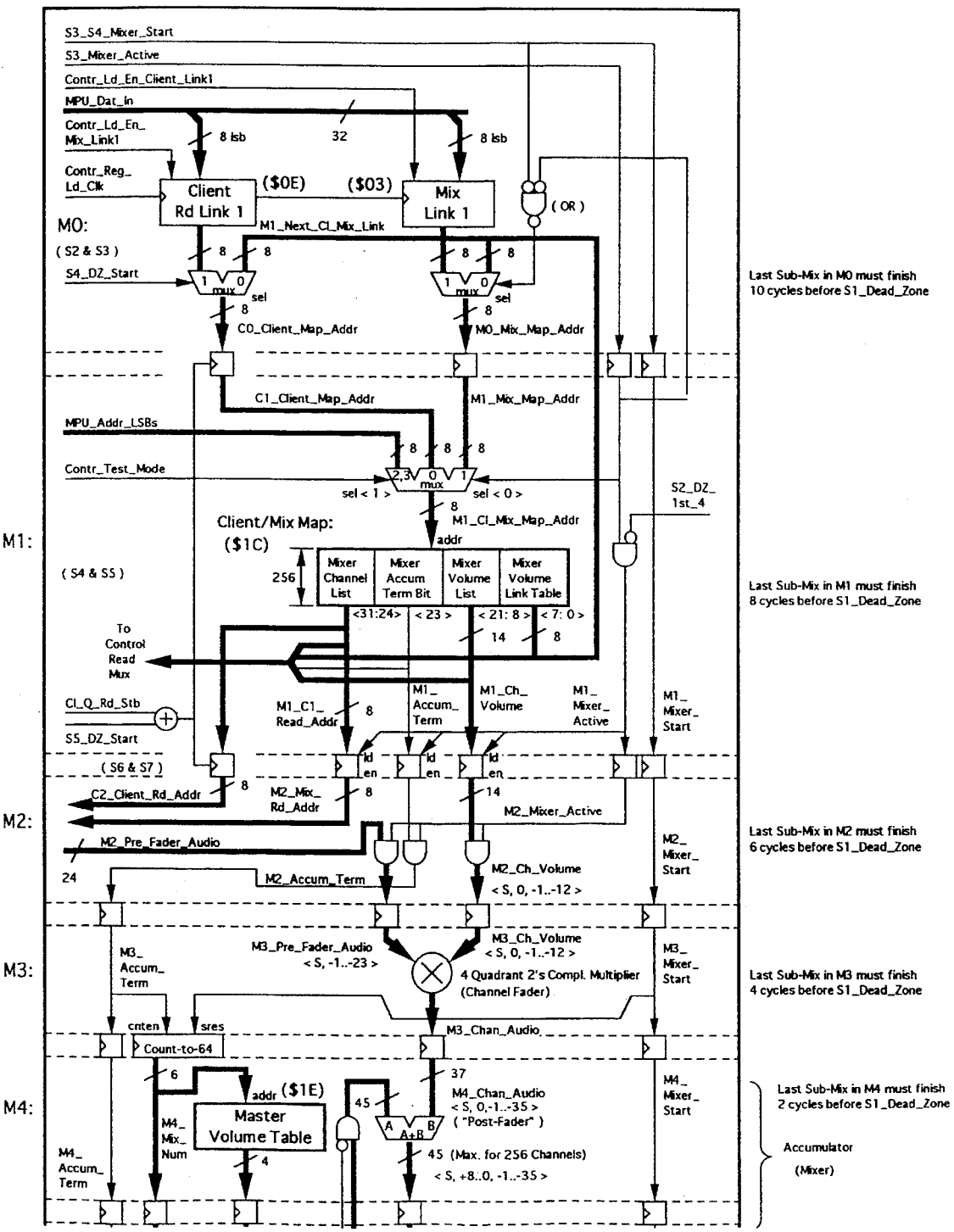
Figure 23C:
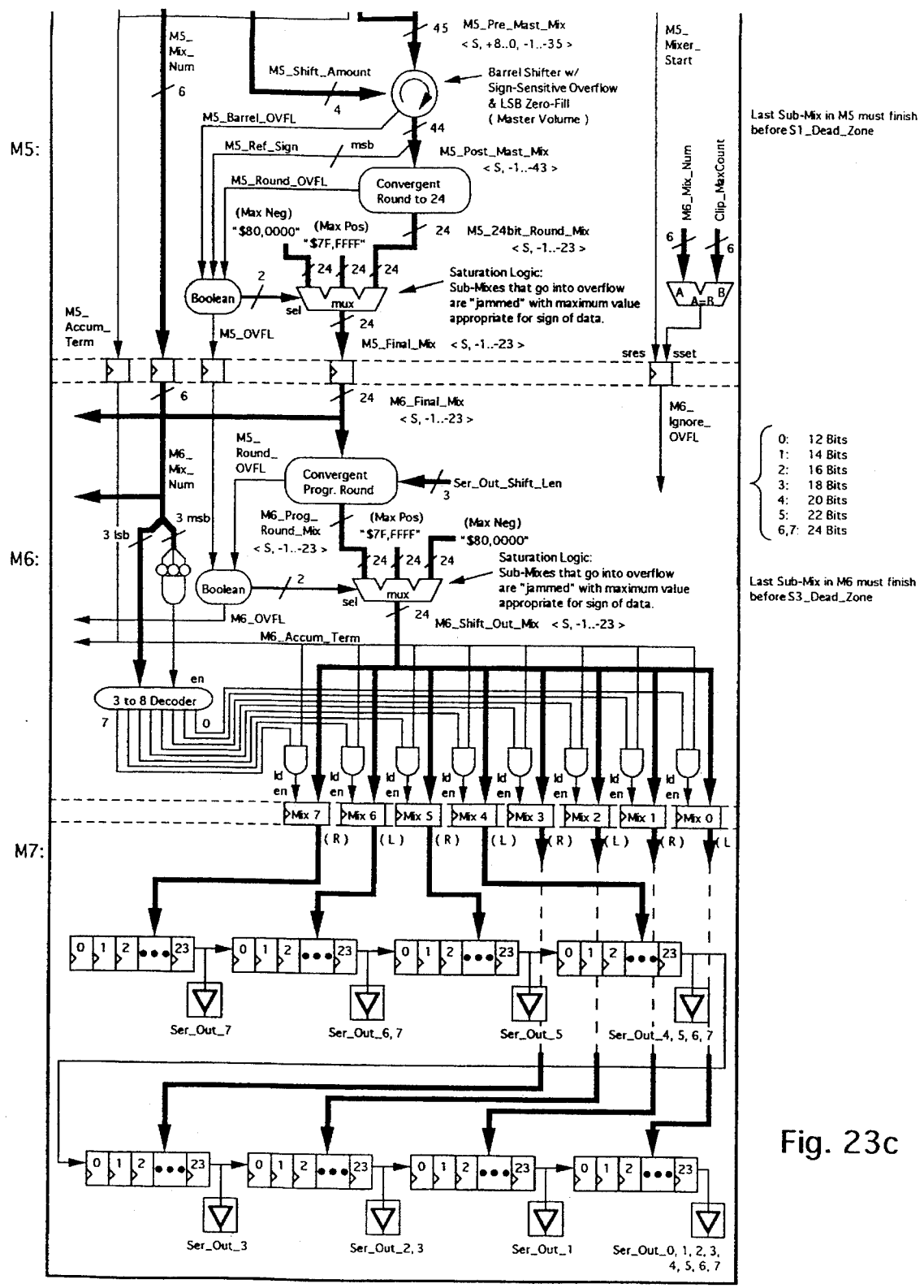

As will be apparent to those of ordinary skill in the art, FIGS. 21–23 depict in block diagram fashion the operation of the TDM ASIC in a preferred embodiment of the invention, with FIG. 21 describing the operation of the control port (under the instructions of the associated microprocessor, FIG. 22 describing the routing of signals within the ASIC, and FIG. 23 describing the operation of the mixer.

While a preferred embodiment of the present invention has been described, it should be understood that various changes, adaptations and modifications may be made therein without departing from the spirit of the invention and the scope of the appended claims.

What is claimed is:

1. An intercom system comprising:
   a plurality of intercom stations, at least some of which include an audio input transducer which generates an audio input communications signal, and at least some of which include an audio output transducer which generates an audio output from an audio output communications signal;
   an analog-to-digital converter for creating digital audio input signals representative of the audio input communications signals received by the intercom stations;
   a digital switching system receiving audio input communications signals from at least some of the stations and sending audio output communications signals to at least some of the stations, the digital switching system including a time division multiplexing system ("TDM") for broadcasting on a TDM bus multiple digital communications signals including such digital audio input signals, the TDM system including one or more interfaces connecting the intercom stations with the TDM bus; and
   a signal mixer capable of receiving from the TDM bus selected ones of the digital audio input signals, and creating and broadcasting on the TDM bus a custom mixed digital audio output communications signal which is a loudness weighted mix of such selected digital audio input signals with at least one of such selected signals optionally being given a larger weight corresponding to a louder volume than others of the selected signals;
   whereby the custom mixed digital audio output signal may be routed to a selected one of the intercom stations as an audio output communications signal and converted by the audio output transducer to audio output.

2. The intercom system of claim 1 wherein the signal mixer includes means for creating and broadcasting on the TDM bus multiple custom mixed digital audio output signals for multiple ones of the intercom stations having an audio output means, at least one of the multiple custom mixed digital audio output signals being comprised of a weighted mix of digital audio input signals that is different than the weighted mix of the other custom mixed digital audio output signal(s).

3. The intercom system of claim 2 wherein the weighted mix of at least one of the custom mixed digital audio output signals includes a selected digital audio input signal which is given a larger weight, corresponding to a louder volume, than such selected input signal is given in another one of the custom mixed digital audio output signals.

4. The intercom system of claim 1 wherein at least some of the intercom stations having audio input means include an analog-to-digital converter for converting the audio input communications signal to a digital audio input communications signal.

5. The intercom system of claim 1 wherein at least some of the intercom stations having audio output means include a digital-to-analog converter for converting a digital audio output communications signal to an analog audio output communications signal.

6. The intercom system of claim 1 including control means for receiving from at least some of the intercom stations requests for custom mixing of communications signals and for controlling the signal mixer to produce a corresponding custom mixed digital audio output signal.

7. The intercom system of claim 6 wherein the control means includes means for controlling the relative loudness weighting of individual ones of the selected digital audio input signals in response to requests from such intercom stations.

8. The intercom system of claim 6 wherein at least some of the intercom stations which have audio output means also include listen request means for generating requests to receive selected ones of the digital audio input signals.

9. The intercom system of claim 8 wherein at least some of the listen request means include means for specifying an independent loudness level for each digital audio input signal requested.

10. An intercom system comprising:
    a plurality of intercom stations having audio input transducers generating corresponding audio input communications signals;
    analog-to-digital converters for creating digital audio input signals representative of the audio input communications signals; and
    a digital switching system receiving audio input communications signals from at least some of the stations and sending audio output communications signals to at least some of the stations, the digital switching system including a time division multiplexing system ("TDM") for broadcasting on a TDM bus multiple digital communications signals including such digital audio input signals;
    digital signal mixer means for receiving a plurality "m" of digital input signals from the TDM bus and creating a plurality "n" of custom mixes of such signals, the number of digital input signals in each sub-mix being dynamically assignable to a number between 0 and m-x where "x" is the number of input signals simultaneously allocated to the other sub-mixes;
    whereby the custom mixed digital audio output signals may be routed to a selected one of the intercom stations as an audio output communications signal.

11. The integrated circuit of claim 10 wherein the signal mixer includes means for adjusting the volume of the input signals being mixed to create loudness weighted custom mixed digital audio output communications signals.

12. An intercom system comprising:
    a plurality of intercom stations having audio input transducers generating corresponding audio input communications signals;
    analog-to-digital converters for creating digital audio input signals representative of the audio input communications signals; and
    a digital switching system receiving digital audio input communications signals from at least some of the stations and sending audio output communications signals to at least some of the stations, the digital switching system including a time division multiplexing system ("TDM") for sequentially broadcasting on a TDM bus multiple digital communications signals including such digital audio input signals;

an integrated circuit for receiving from the TDM bus a plurality of digital signals and for processing such signals, the integrated circuit including:

an inbound buffer for storing signal samples received from the TDM bus;

map means for routing each of a plurality of selected signal samples from the buffer;

digital signal mixer means for receiving a plurality "m" of digital input signals from the buffer and creating a plurality "n" of custom mixes of such signals, the number of digital input signals in each sub-mix being dynamically assignable within the range of 0 to m-x where "x" is the number of input signals simultaneously allocated to the other sub-mixes;

whereby the custom mixed output signals may be routed to a selected one of the intercom stations.

13. The intercom system of claim 12 further comprising volume control means associated with each of the mixer inputs for selectively controlling the loudness of the signal routed to such mixer input.

14. A digital communications signal mixer comprising:

a plurality of inputs for receiving a plurality of digital communications input signals, and a plurality of outputs for sending a plurality of digital communications output signals;

a digital switching system receiving input signals from at least some of the inputs and sending output signals to at least some of the outputs, the digital switching system including a time division multiplexing system ("TDM") for sequentially broadcasting on a TDM bus multiple digital communications signals including such input signals;

the digital switching system including a plurality of integrated circuits, each such circuit including means for independently receiving from the TDM bus a plurality of digital signals and for processing such signals, each such integrated circuit including an inbound buffer associated therewith for storing signal samples received from the TDM bus;

each integrated circuit including digital signal mixer means for receiving a plurality "m" of digital input signals from the inbound buffer and creating a plurality "n" of custom sub-mixes of such signals, the number of digital input signals in each sub-mix being dynamically assignable within the range of 0 to m-x where "x" is the number of input signals simultaneously allocated to the other sub-mixes;

the digital switching system further including map means associated with each such integrated circuit for routing each of the selected digital input signals from the buffer to the mixer to enable creation of the custom sub-mixes.

* * * * *